US012365219B2

(12) United States Patent
Okamura et al.

(10) Patent No.: US 12,365,219 B2
(45) Date of Patent: Jul. 22, 2025

(54) REFRIGERATION CYCLE DEVICE

(71) Applicant: DENSO CORPORATION, Kariya (JP)

(72) Inventors: Tooru Okamura, Kariya (JP); Yoshiki Katoh, Kariya (JP); Masamichi Makihara, Kariya (JP); Kuniyoshi Tanioka, Kariya (JP); Takahiro Maeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 328 days.

(21) Appl. No.: 17/643,075

(22) Filed: Dec. 7, 2021

(65) Prior Publication Data

US 2022/0088996 A1 Mar. 24, 2022

Related U.S. Application Data

(63) Continuation of application No. PCT/JP2020/021883, filed on Jun. 3, 2020.

(30) Foreign Application Priority Data

Jun. 10, 2019 (JP) ................................. 2019-107954

(51) Int. Cl.
  *F25B 40/02* (2006.01)
  *B60H 1/00* (2006.01)
  *B60H 1/22* (2006.01)
(52) U.S. Cl.
  CPC ..... *B60H 1/00914* (2013.01); *B60H 1/00885* (2013.01); *B60H 1/2221* (2013.01); *B60H 2001/00961* (2019.05); *F25B 40/02* (2013.01)
(58) Field of Classification Search
  CPC ...... B60H 2001/00171; B60H 1/00914; B60H 1/00885
  See application file for complete search history.

(56) References Cited

U.S. PATENT DOCUMENTS 9,951,962 B2 * 4/2018 Tamaki ................. F24H 15/385
2018/0208019 A1 7/2018 Sugimura et al.
(Continued)

FOREIGN PATENT DOCUMENTS

JP 2007285550 A 11/2007
JP 2017065440 A * 4/2017 ......... B60H 1/00328
(Continued)

OTHER PUBLICATIONS

JP-2017065440-A English Translation (Year: 2017).*
WO-2015194107-A1 English Translation (Year: 2015).*

*Primary Examiner* — Frantz F Jules
*Assistant Examiner* — Devon Moore
(74) *Attorney, Agent, or Firm* — Harness, Dickey & Pierce, P.L.C.

(57) ABSTRACT

In a refrigeration cycle device, a heat supply unit is disposed in parallel with a heat utilization unit in a flow of a heat medium. A branching part branches the heat medium flowing out of a heat radiator into a flow flowing toward the heat utilization unit and a flow flowing toward the heat supply unit. A merging part is configured to cause the heat medium having passed through the heat utilization unit and the heat medium having passed through the heat supply unit to merge together and to flow toward the heat radiator. A switching unit switches an operation state between a first state in which the heat medium circulates between the heat radiator and the heat utilization unit, and a second state in which the heat medium circulates between the heat radiator, the heat utilization unit and the heat supply unit.

18 Claims, 9 Drawing Sheets

(56) References Cited

U.S. PATENT DOCUMENTS

| | | | |
|---|---|---|---|
| 2019/0135071 A1 | 5/2019 | Hwang et al. | |
| 2019/0176572 A1* | 6/2019 | Kim | B60H 1/00428 |
| 2020/0101814 A1* | 4/2020 | Takagi | B60H 1/00007 |
| 2020/0298662 A1* | 9/2020 | Herbolzheimer | B60H 1/00 |
| 2020/0317026 A1* | 10/2020 | Kitamura | B60H 1/00899 |
| 2020/0338956 A1* | 10/2020 | Oh | B60H 1/32284 |
| 2021/0245572 A1 | 8/2021 | Hwang et al. | |

FOREIGN PATENT DOCUMENTS

| | | | | |
|---|---|---|---|---|
| JP | 2017072309 A | 4/2017 | | |
| JP | 6399060 B2 | 10/2018 | | |
| JP | 2019060580 A | 4/2019 | | |
| JP | 2019085102 A | 6/2019 | | |
| WO | WO-2015194107 A1 * | 12/2015 | | B60H 1/00342 |

* cited by examiner

REFRIGERATION CYCLE DEVICE

CROSS REFERENCE TO RELATED APPLICATION

The present application is a continuation application of International Patent Application No. PCT/JP2020/021883 filed on Jun. 3, 2020, which designated the U.S. and claims the benefit of priority from Japanese Patent Application No. 2019-107954 filed on Jun. 10, 2019. The entire disclosures of all of the above applications are incorporated herein by reference.

TECHNICAL HELD

The present disclosure relates to a refrigeration cycle device capable of supplying heat of a heat radiator to a heat absorption unit.

BACKGROUND

Conventionally, a heat pump system, which utilizes coolant (i.e., cooling water) to absorb heat from the outside air, has been described. In this conventional technique, the coolant, cooled in a chiller of a refrigeration cycle, absorbs heat from the outside air in a low-temperature radiator, and the coolant, heated in a water-cooled condenser of the refrigeration cycle, dissipates heat in a heater core, thereby performing an interior heating.

SUMMARY

According to an aspect of the present disclosure, a refrigeration cycle device includes a compressor, a heat radiator, a decompressor, a heat absorption unit, a heat utilization unit, a heat supply unit, a branching part, a merging part, and a switching unit.

The heat utilization unit is configured to utilize heat of the heat medium heated in the heat radiator. The heat supply unit is disposed in parallel with the heat utilization unit in a flow of the heat medium, and is configured to supply the heat of the heat medium heated in the heat radiator to the heat absorption unit. The branching part is configured to branch the heat medium flowing out of the heat radiator into a flow flowing toward the heat utilization unit and a flow flowing toward the heat supply unit. The merging part is configured to cause the heat medium having passed through the heat utilization unit and the heat medium having passed through the heat supply unit to merge together and to flow toward the heat radiator.

The switching unit can be configured to switch an operation state between a first state in which the heat medium circulates between the heat radiator and the heat utilization unit, and a second state in which the heat medium circulates between the heat radiator, the heat utilization unit and the heat supply unit

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
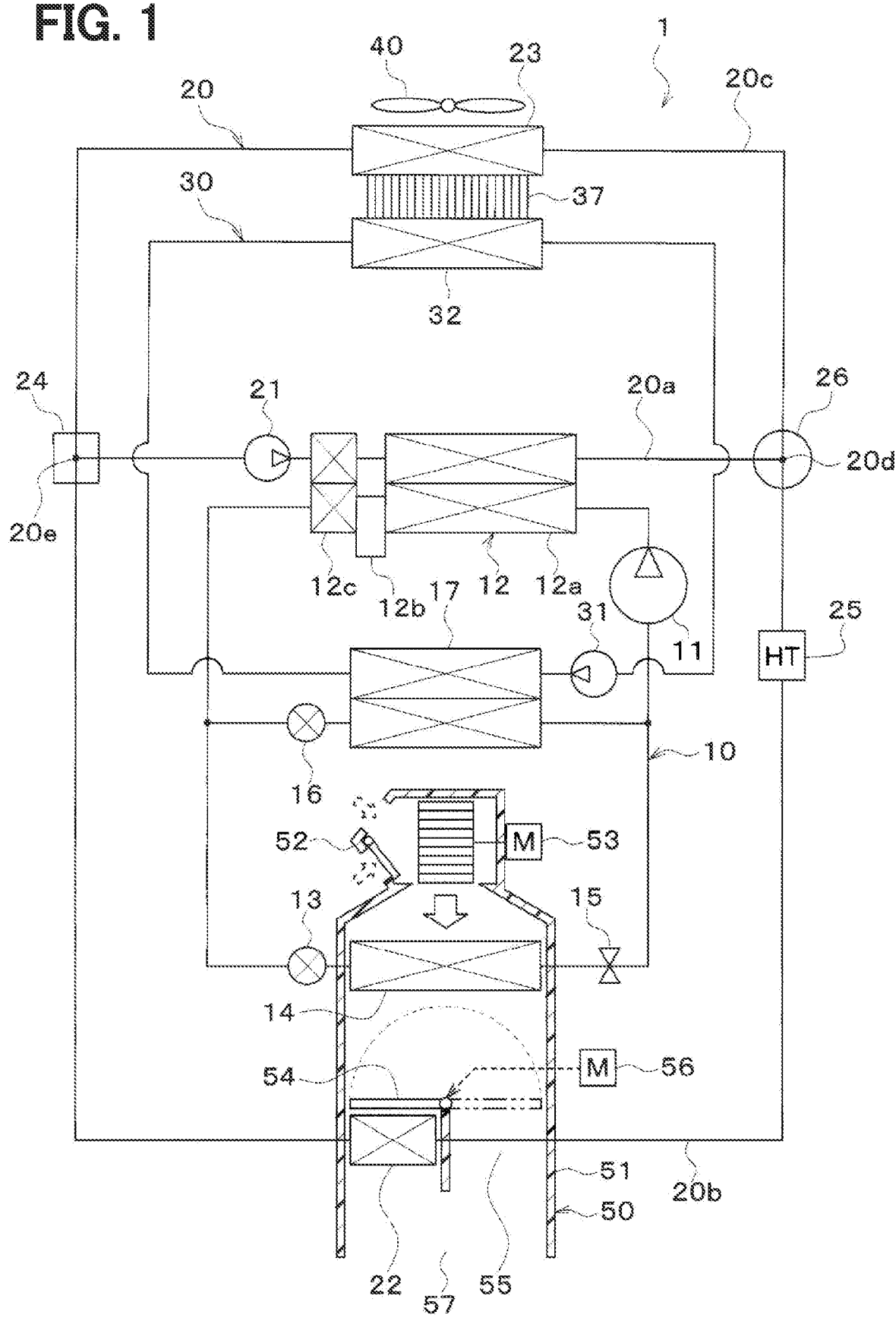
FIG. 1 illustrates an overall configuration diagram of a refrigeration cycle device according to a first embodiment.

A refrigeration cycle device may include a chiller in which coolant (e.g., cooling water) is cooled, and a low-temperature radiator (LT radiator) in which refrigerant absorbs heat from outside air, and a water-cooled condenser. Coolant is heated in the water-cooled condenser, and dissipates heat in a heater core, thereby performing an interior heating. When frost adheres to the LT radiator, the LT radiator may be defrosted by supplying the coolant heated in the water-cooled condenser to the LT radiator.

At the time of defrosting the LT radiator, the coolant flowing out of the LT radiator flows through the water-cooled condenser and a bypass flow path in parallel. In this case, the high-temperature coolant heated in the water-cooled condenser and the intermediate-temperature coolant having passed through the bypass flow path are mixed and flow into the LT radiator, so that heat shock in the LT radiator can be reduced. Thus, it is possible to reduce a rapid temperature change caused by the inflow of the high-temperature coolant into the low-temperature LT radiator.

When the defrosting of the LT radiator (i.e., heat absorption unit) is started, the low-temperature coolant flowing out of the LT radiator flows into the high-temperature water-cooled condenser (i.e., heat dissipation part, heat radiator), and thus heat shock is generated in the water-cooled condenser.

In view of the above points, an object of the present disclosure is to reduce heat shock in a heat absorption unit and a heat radiator when the heat of the heat radiator is supplied to the heat absorption unit.

According to an exemplar embodiment of the present disclosure, a refrigeration cycle device includes a compressor, a heat radiator, a decompressor, a heat absorption unit, a heat utilization unit, a heat supply unit, a branching part, a merging part, and a switching unit.

The compressor is configured to draw, compress, and discharge a refrigerant; a heat radiator configured to exchange heat between the refrigerant discharged from the compressor and a heat medium to cause the refrigerant to dissipate heat and heat the heat medium. The decompressor is configured to decompress the refrigerant having heat-dissipated in the heat radiator. The heat absorption unit is configured to absorb heat by evaporating the refrigerant decompressed in the decompressor.

The heat utilization unit is configured to utilize heat of the heat medium heated in the heat radiator. The heat supply unit is disposed in parallel with the heat utilization unit in a flow of the heat medium, and is configured to supply the heat of the heat medium heated in the heat radiator to the heat absorption unit. The branching part is configured to branch the heat medium flowing out of the heat radiator into a flow flowing toward the heat utilization unit and a flow flowing toward the heat supply unit. The merging part is configured to cause the heat medium having passed through the heat utilization unit and the heat medium having passed through the heat supply unit to merge together and to flow toward the heat radiator.

The switching unit is configured to switch an operation state between a first state in which the heat medium circulates between the heat radiator and the heat utilization unit, and a second state in which the heat medium circulates between the heat radiator, the heat utilization unit, and the heat supply unit With this configuration, when the operation state is switched from the first state to the second state, the heat medium of the heat radiator branches into a flow flowing toward the heat utilization unit and a flow flowing toward the heat supply unit, and the heat medium having passed through the heat supply unit merges with the heat medium having passed through the heat utilization unit and flows into the heat radiator.

Thus, the flow rate of the heat medium flowing into the heat supply unit can be reduced, and the temperature of the heat medium flowing into the heat radiator can be made higher than the temperature of the heat medium having passed through the heat supply unit. Therefore, the heat shock in each of the heat absorption unit and the heat radiator can be reduced.

For example, a pump may be provided to draw and discharge the heat medium; and a controller may be configured to control the switching unit and the pump. In this case, the controller controls the pump to cause a time change rate in the temperature of the heat medium flowing into the heat radiator to become smaller when the operation state is switched from the first state to the second state.

The switching unit may be configured to adjust a flow rate ratio of the heat medium flowing between the heat utilization unit and the heat supply unit in the second state, and the controller may control the switching unit to cause a flow rate of the heat medium flowing toward the heat supply unit to become smaller than a flow rate of the heat medium flowing toward the heat utilization unit when the operation state is switched from the first state to the second state. In this case, the controller may be configured to increase the flow rate of the heat medium flowing toward the heat supply unit in accordance with an elapsed time after the operation state is switched from the first state to the second state.

In the refrigeration cycle device, an evaporator may be configured to evaporate the refrigerant decompressed in the decompressor and to cool and dehumidify air, and the heat utilization unit may include a heater core configured to utilize the heat medium heated in the heat radiator and to heat at least one of air cooled and dehumidified in the evaporator and air flowing while bypassing the evaporator. In this case, the switching unit may be configured to switch the operation state from the first state to the second state, when a defrosting mode, in which the heat absorption unit is defrosted utilizing the heat of the heat medium, is switched from a dehumidifying and heating mode in which the air cooled and dehumidified in the evaporator is heated in the heater core, or from a heating mode in which the air flowing while bypassing the evaporator is heated in the heater core.

Hereinafter, multiple embodiments for performing the present disclosure will be described with reference to the drawings. In each embodiment, portions corresponding to those described in the preceding embodiment are denoted by the same reference numerals, and overlapping descriptions may be omitted. In a case where only a part of a configuration is described in each embodiment, the other embodiments described above are capable of being applied for the other parts of the configuration. Not only a combination of parts that clearly indicate that the combination is possible in each embodiment, but also a partial combination of embodiments even if the combination is not specified is also possible when there is no problem in the combination.

First Embodiment

Embodiments will be described below with reference to the drawings. A vehicular air conditioner 1 illustrated in FIG. 1 is an air conditioner for regulating the space in a cabin (i.e., space to be air conditioned) to an appropriate temperature. The vehicular air conditioner 1 includes a refrigeration cycle device 10.

The refrigeration cycle device 10 is mounted on an electric vehicle, a hybrid vehicle, or the like. The electric vehicle is an automobile that obtains a driving force for vehicle traveling from a traveling electric motor. The hybrid vehicle is an automobile that obtains a driving force for vehicle traveling from an engine (i.e., internal combustion engine) and a traveling electric motor.

The refrigeration cycle device 10 is a vapor compression type refrigerator provided with a compressor 11, a condenser 12, a first expansion valve 13, an air-side evaporator 14, a constant pressure valve 15, a second expansion valve 16, and a coolant-side evaporator 17. In the refrigeration cycle device 10 of the present embodiment, a fluorocarbon refrigerant is used as a refrigerant, and a subcritical refrigeration cycle is constituted in which the pressure of a high-pressure-side refrigerant does not exceed the critical pressure of refrigerant.

The second expansion valve 16 and the coolant-side evaporator 17 are disposed in parallel with the first expansion valve 13, the air-side evaporator 14, and the constant pressure valve 15 in the refrigerant flow.

In the refrigeration cycle device 10, a first refrigerant circulation circuit and a second refrigerant circulation circuit are formed. In the first refrigerant circulation circuit, the refrigerant circulates in the order of the compressor 11, the condenser 12, the first expansion valve 13, the air-side evaporator 14, the constant pressure valve 15, and the compressor 11. In the second refrigerant circulation circuit, the refrigerant circulates in the order of the compressor 11, the condenser 12, the second expansion valve 16, and the coolant-side evaporator 17.

The compressor 11 is an electric compressor driven by electric power supplied from a battery and sucks, compresses, and discharges the refrigerant of the refrigeration cycle device 10. The electric motor of the compressor 11 is controlled by a controller 60. The compressor 11 may be a variable displacement compressor driven by a belt.

The condenser 12 is a high-pressure-side heat exchanger for exchanging heat between a high-pressure-side refrigerant discharged from the compressor 11 and coolant (e.g., cooling water) of a high-temperature coolant circuit 20. The condenser 12 is a heat radiator (heat dissipation part) that exchanges heat between the refrigerant discharged from the compressor 11 and the coolant to dissipate heat from the refrigerant and heat the coolant.

In the case of an electric vehicle, the compressor 11 and the condenser 12 are disposed in a motor room of the vehicle. The motor room is a space in which the traveling electric motor is accommodated. In the case of a hybrid vehicle, the compressor 11 and the condenser 12 are disposed in an engine room of the vehicle. The engine room is a space in which the engine is accommodated.

The condenser 12 includes a condensation portion 12a, a receiver 12b, and a subcooling portion 12c. In the condenser 12, the refrigerant flows through the condensation portion 12a, the receiver 12b, and the subcooling portion 12c in this order.

The condensation portion 12a exchanges heat between the high-pressure-side refrigerant discharged from the compressor 11 and the coolant in the high-temperature coolant circuit 20 to condense the high-pressure-side refrigerant.

The receiver 12b is a gas-liquid separation part that separates the gas-liquid of the high-pressure refrigerant flowing out of the condenser 12 and allows the separated liquid-phase refrigerant to flow out to the downstream side while storing the excess refrigerant in the cycle.

The subcooling portion 12c exchanges heat between the liquid-phase refrigerant flowing out of the receiver 12b and the coolant in the high-temperature coolant circuit 20 to subcool the liquid-phase refrigerant.

The coolant in the high-temperature coolant circuit 20 is fluid as a heat medium. The coolant in the high-temperature coolant circuit 20 is a high-temperature heat medium. In the present embodiment, a liquid containing at least ethylene glycol, dimethylpolysiloxane, or nanofluid, or an antifreeze liquid body, is used as the coolant in the high-temperature coolant circuit 20. The high-temperature coolant circuit 20 is a high-temperature heat medium circuit in which a high-temperature heat medium circulates.

The first expansion valve 13 is a first decompressor for decompressing and expanding the liquid-phase refrigerant flowing out of the receiver 12b. The first expansion valve 13 is an electric expansion valve. The electric expansion valve is an electric variable throttle mechanism including a valve element configured to change the throttle opening and an electric actuator for changing the opening of the valve element.

The first expansion valve 13 is a refrigerant flow switching unit for switching between a state in which the refrigerant flows to the air-side evaporator 14 and a state in which the refrigerant does not flow. The operation of the first expansion valve 13 is controlled by a control signal output from the controller 60.

The first expansion valve 13 may be a mechanical temperature expansion valve. When the first expansion valve 13 is a mechanical temperature expansion valve, an on-off valve for opening and closing the refrigerant flow path on the first expansion valve 13 side needs to be provided separately from the first expansion valve 13.

The air-side evaporator 14 is an evaporator for exchanging heat between the refrigerant flowing out of the first expansion valve 13 and the air blown into the cabin to evaporate the refrigerant. In the air-side evaporator 14, the refrigerant absorbs heat from the air blown into the cabin. The air-side evaporator 14 is an air cooler for cooling the air blown into the cabin.

The constant pressure valve 15 is a pressure regulation part for maintaining the pressure of the refrigerant at the outlet side of the air-side evaporator 14 at a predetermined value. The constant pressure valve 15 is formed of a mechanical variable throttle mechanism. Specifically, the constant pressure valve 15 decreases the passage area (i.e., throttle opening) of a refrigerant passage when the pressure of the refrigerant on the outlet side of the air-side evaporator 14 falls below a predetermined value, and the constant pressure valve 15 increases the passage area (i.e., throttle opening) of the refrigerant passage when the pressure of the refrigerant on the outlet side of the air-side evaporator 14 exceeds the predetermined value. The vapor phase refrigerant with its pressure regulated in the constant pressure valve 15 is sucked into the compressor 11 and compressed.

In a case where there is little fluctuation in the flow rate of the circulating refrigerant circulating through the cycle or some other case, instead of the constant pressure valve 15, a fixed throttle made of an orifice, a capillary tube, or the like may be employed.

The second expansion valve 16 is a second decompressor for decompressing and expanding the liquid-phase refrigerant flowing out of the condenser 12. The second expansion valve 16 is an electric expansion valve. The electric expansion valve is an electric variable throttle mechanism including a valve element configured to change the throttle opening and an electric actuator for changing the opening of the valve element. The second expansion valve 16 can fully close the refrigerant flow path.

The second expansion valve 16 is a refrigerant flow switching unit for switching between a state in which the refrigerant flows to the coolant-side evaporator 17 and a state in which the refrigerant does not flow. The operation of the second expansion valve 16 is controlled by a control signal output from the controller 60.

The second expansion valve 16 may be a mechanical temperature expansion valve. When the second expansion valve 16 is a mechanical temperature expansion valve, an on-off valve for opening and closing the refrigerant flow path on the second expansion valve 16 side needs to be provided separately from the second expansion valve 16.

The coolant-side evaporator 17 is an evaporation part that exchanges heat between the refrigerant flowing out of the second expansion valve 16 and the coolant of a low-temperature coolant circuit 30 to evaporate the refrigerant. In the coolant-side evaporator 17, the refrigerant absorbs heat from the coolant of the low-temperature coolant circuit 30. The coolant-side evaporator 17 is a heat medium cooler for cooling the coolant of the low-temperature coolant circuit 30. A vapor phase refrigerant evaporated in the coolant-side evaporator 17 is sucked into the compressor 11 and compressed.

The coolant of the low-temperature coolant circuit 30 is fluid as a heat medium. The coolant of the low-temperature coolant circuit 30 is a low-temperature heat medium. In the present embodiment, a liquid containing at least ethylene glycol, dimethylpolysiloxane, or nanofluid, or an antifreeze liquid body, is used as the coolant of the low-temperature coolant circuit 30. The low-temperature coolant circuit 30 is a low-temperature heat medium circuit in which a low-temperature heat medium circulates.

In the high-temperature coolant circuit 20, the condenser 12, a high-temperature-side pump 21, a heater core 22, a high-temperature-side radiator 23, a reserve tank 24, and an electric heater 25 are disposed.

The high-temperature-side pump 21 is a heat medium pump for sucking and discharging coolant. The high-temperature-side pump 21 is an electric pump. The high-temperature-side pump 21 is an electric pump having a constant discharge flow rate, but the high-temperature-side pump 21 may be an electric pump having a variable discharge flow rate.

The heater core 22 is an air heater that exchanges heat between the coolant in the high-temperature coolant circuit 20 and the air blown into the cabin to heat the air blown into the cabin. In the heater core 22, the coolant dissipates heat to the air blown into the cabin. The heater core 22 is a heat utilization unit that utilizes the heat of the coolant heated in the condenser 12.

The high-temperature-side radiator 23 is a radiator that exchanges heat between the coolant in the high-temperature coolant circuit 20 and the outside air to dissipate heat from the coolant to the outside air.

The condenser 12 and the high-temperature-side pump 21 are disposed in a condenser flow path 20a. The condenser flow path 20a is a flow path through which the coolant in the high-temperature coolant circuit 20 flows.

The flow direction of the coolant in the condenser 12 faces the flow direction of the refrigerant in the condenser 12. That is, in the condenser 12, the coolant flows through the subcooling portion 12c and the condensation portion 12a in this order.

The heater core 22 is disposed in a heater core flow path 20b. The heater core flow path 20b is a flow path through which the coolant in the high-temperature coolant circuit 20 flows.

The high-temperature-side radiator 23 is disposed in a radiator flow path 20c. The radiator flow path 20c is a flow path through which the coolant in the high-temperature coolant circuit 20 flows in parallel with the heater core 22.

A three-way valve 26 is disposed in a branching part 20d of the high-temperature coolant circuit 20. The branching part 20d is a branching part for branching the condenser flow path 20a into a heater core flow path 20b and a radiator flow path 20c.

Three-way valve 26 is a switching unit for switching the flow of the coolant in the high-temperature coolant circuit 20. The three-way valve 26 opens and closes the heater core flow path 20b and the radiator flow path 20c. The three-way valve 26 adjusts the opening of the heater core flow path 20b and the opening of the radiator flow path 20c. The three-way valve 26 adjusts the opening ratio between the heater core flow path 20b and the radiator flow path 20c, Hence the three-way valve 26 regulates the flow rate ratio between the coolant flowing in the heater core 22 and the coolant flowing in the high-temperature-side radiator 23.

A reserve tank 24 is disposed at a merging part 20e of the high-temperature coolant circuit 20. The merging part 20e is a merging part for merging the heater core flow path 20b and the radiator flow path 20c into the condenser flow path 20a.

The reserve tank 24 is a storage part for storing excess coolant. Storing the excess coolant in the reserve tank 24 can prevent a decrease in the amount of the coolant circulating in each flow path.

The high-temperature-side reserve tank 24 is a closed type reserve tank or an atmospheric open type reserve tank. The closed type reserve tank is a reserve tank for setting the pressure of the stored coolant at the liquid level to predetermined pressure. The atmospheric open type reserve tank is a reserve tank for setting the pressure of the stored coolant at the liquid level to atmospheric pressure.

The reserve tank 24 has a gas-liquid separation function of separating air bubbles mixed in the coolant from the coolant.

The electric heater 25 is disposed on the downstream side of the branching part 20d of the high-temperature coolant circuit 20 and on the upstream side of the heater core 22. The electric heater 25 generates Joule heat by electric power being supplied from the battery. The electric heater 25 is a heater for heating coolant by generating Joule heat. The electric heater 25 supplementarily heats the coolant in the high-temperature coolant circuit 20. The electric heater 25 is controlled by the controller 60.

In the low-temperature coolant circuit 30, a low-temperature-side pump 31, the coolant-side evaporator 17, and a low-temperature-side radiator 32 are disposed.

The low-temperature-side pump 31 is a heat medium pump for sucking and discharging coolant. The low-temperature-side pump 31 is an electric pump. The low-temperature-side radiator 32 exchanges heat between the coolant of the low-temperature coolant circuit 30 and the outside air to absorb heat from the outside air into the coolant of the low-temperature coolant circuit 30. The coolant-side evaporator 17 and the low-temperature-side radiator 32 are heat absorption units that evaporate the refrigerant decompressed in the second expansion valve 16 to absorb heat.

The high-temperature-side radiator 23 and the low-temperature-side radiator 32 are disposed in series in this order in the flow direction of the outside air. The outside air is blown to the high-temperature-side radiator 23 and the low-temperature-side radiator 32 by an outside blower 40.

The outside blower 40 is an outside air blowing part for blowing the outside air toward the high-temperature-side radiator 23 and the low-temperature-side radiator 32. The outside blower 40 is an electric blower for driving a fan by an electric motor. The operation of the outside blower 40 is controlled by a controller 60.

The high-temperature-side radiator 23, the low-temperature-side radiator 32, and the outside blower 40 are disposed in the foremost part of the vehicle. Accordingly, during the traveling of the vehicle, the traveling air can be applied to the high-temperature-side radiator 23 and the low-temperature-side radiator 32.

The high-temperature-side radiator 23 and the low-temperature-side radiator 32 are joined to each other by a common fin 37.

The common fin 37 is a heat exchange promoting member for promoting heat exchange between coolant and air. The common fin 37 is a metal (e.g., aluminum) member.

The common fin 37 is a coupling part that couples the high-temperature-side radiator 23 and the low-temperature-side radiator 32 with metal to transfer heat from the high-temperature-side radiator 23 to the low-temperature-side radiator 32

The air-side evaporator 14 and the heater core 22 are accommodated in an air conditioning casing 51 of the cabin inside air conditioning unit 50. The cabin inside air conditioning unit 50 is disposed inside an instrument panel (not illustrated) in the front part of the cabin. The air conditioning casing 51 is an air passage formation member for forming an air passage.

The heater core 22 is disposed on the air flow downstream side of the air-side evaporator 14 in the air passage in the air conditioning casing 51. An inside/outside air switching box 52 and an inside blower 53 are disposed in the air conditioning casing 51.

The inside/outside air switching box 52 is an inside/outside air switching unit for switching and introducing the inside air and the outside air into the air passage in the air conditioning casing 51. The inside blower 53 sucks and blows the inside air and the outside air introduced into the air passage in the air conditioning casing 51 through the inside/outside air switching box 52. The operation of the inside blower 53 is controlled by the controller 60.

An air-mix door 54 is disposed between the air-side evaporator 14 and the heater core 22 in an air passage in an air conditioning casing 51. The air-mix door 54 regulates the air volume ratio between cold air flowing into the heater core 22 and cold air flowing through a cold air bypass passage 55 out of cold air having passed through the air-side evaporator 14.

The cold air bypass passage 55 is an air passage in which the cold air having passed through the air-side evaporator 14 flows while bypassing the heater core 22.

The air-mix door 54 is a rotary door having a rotary shaft rotatably supported to the air conditioning casing 51 and a door substrate part coupled to the rotary shaft. By regulating the opening position of the air-mix door 54, the temperature of the conditioned air to be blown into the cabin from the air conditioning casing 51 can be regulated to a desired temperature.

The rotary shaft of the air-mix door 54 is driven by a servomotor 56. The operation of the air-mix door servomotor 56 is controlled by the controller 60.

The air-mix door 54 may be a sliding door that slides in a direction substantially orthogonal to the air flow. The sliding door may be a plate-like door formed of a rigid body. The film door may be formed of flexible film material.

The air conditioning air regulated in temperature by the air-mix door 54 is blown out into the cabin from a blowout port 57 formed in the air conditioning casing 51.

Figure 2:
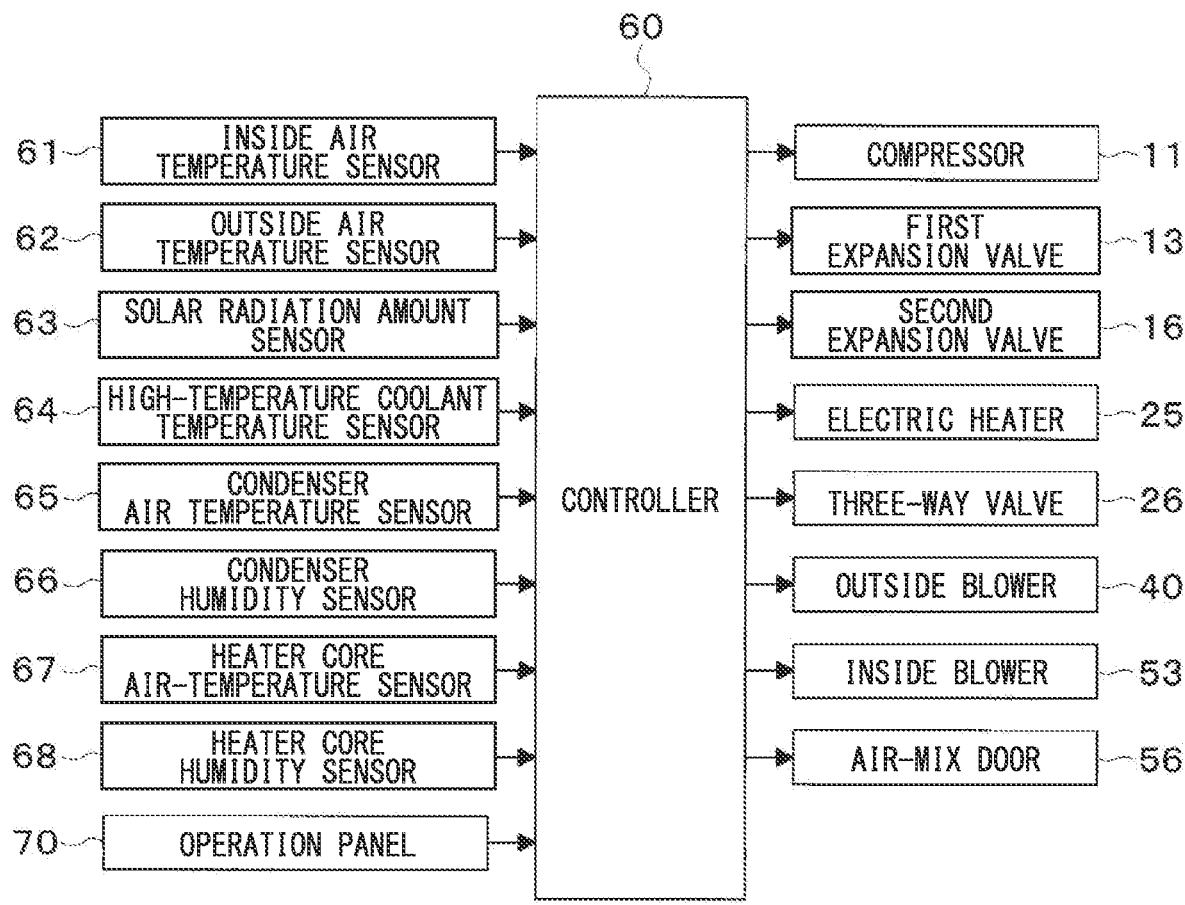
FIG. 2 is a block diagram illustrating an electrical controller of the refrigeration cycle device according to the first embodiment.

The controller 60 illustrated in FIG. 2 is made up of a microcomputer including a central processing unit (CPU), a read-only memory (ROM), a random-access memory (RAM,) and the like, and peripheral circuits thereof. The controller 60 performs various operations and processing based on a control program stored in the ROM. Various devices to be controlled are connected to the output side of the controller 60. The controller 60 is a controller for controlling the operation of various devices to be controlled.

The devices to be controlled, which are controlled by the controller 60, includes the compressor 11, the first expansion valve 13, the second expansion valve 16, the three-way valve 26, the outside blower 40, the inside blower 53, the air-mix door servomotor 56, and the like.

Software and hardware for controlling the electric motor of the compressor 11 in the controller 60 are a refrigerant discharge capacity control part. Software and hardware for controlling the first expansion valve 13 and the second expansion valve 16 in the controller 60 are a throttle control part.

Software and hardware for controlling the three-way valve 26 in the controller 60 is a high-temperature heat medium flow control part. Software and hardware for controlling the outside blower 40 in the controller 60 are an outside air blowing capacity control part.

Software and hardware for controlling the inside blower 53 in the controller 60 are an air blowing capacity control part. Software and hardware for controlling the air-mix door servomotor 56 in the controller 60 are an air volume ratio control part.

A group of various control sensors is connected to the input side of the controller 60. The group of various control sensors includes an inside air temperature sensor 61, an outside air temperature sensor 62, a solar radiation amount sensor 63, a high-temperature coolant temperature sensor 64, a condenser air temperature sensor 65, a condenser humidity sensor 66, a heater core air temperature sensor 67, a heater core humidity sensor 68, and the like.

The inside air temperature sensor 61 detects a cabin inside temperature Tr. The outside air temperature sensor 62 detects an outside air temperature Tam. The solar radiation amount sensor 63 detects a solar radiation amount Ts in the cabin.

The high-temperature coolant temperature sensor 64 detects a temperature TW of the coolant in the high-temperature coolant circuit 20. For example, the high-temperature coolant temperature sensor 64 detects the temperature of the coolant flowing out of the condenser 12.

The condenser air temperature sensor 65 detects the temperature of the air in the vicinity of the condenser 12. In other words, the condenser air temperature sensor 65 detects the temperature of the air in the motor room or the engine room of the vehicle.

The condenser humidity sensor 66 detects humidity in the vicinity of the condenser 12. In other words, the condenser humidity sensor 66 detects humidity in the motor room or the engine room of the vehicle.

The controller 60 calculates a dew point temperature in the vicinity of the condenser 12 based on the air temperature detected by the condenser air temperature sensor 65, the humidity detected by the condenser humidity sensor 66, and the like.

The heater core air temperature sensor 67 detects the temperature of the air in the vicinity of the heater core 22. In other words, the heater core air temperature sensor 67 detects the temperature of the air in the air conditioning casing 51.

The heater core humidity sensor 68 detects humidity in the vicinity of the heater core 22. In other words, the heater core humidity sensor 68 detects the humidity in the air conditioning casing 51.

The controller 60 calculates the dew point temperature in the vicinity of the heater core 22 based on the air temperature detected by the heater core air temperature sensor 67, the humidity detected by the heater core humidity sensor 68, and the like.

Various operation switches (not illustrated) are connected to the input side of the controller 60. The various operation switches are provided on an operation panel 70 and operated by an occupant. The operation panel 70 is disposed near the instrument panel in the front part of the cabin. The controller 60 receives inputs of operation signals from the various operation switches.

The various operation switches are an auto switch, an air conditioner switch, a temperature setting switch, and the like. The auto switch is a switch for setting and canceling the automatic control operation of the vehicular air conditioner 1. The air conditioner switch is a switch for setting whether or not the air is cooled in the cabin inside air conditioning unit 50. The temperature setting switch is a switch for setting a set temperature in the cabin.

Next, the operation in the above configuration will be described. Hereinafter, a description will be given of the operation of the controller 60 when the automatic switch of the operation panel 70 has been turned on by the occupant. When the air conditioner switch of the operation panel 70 has been turned on by the occupant, the operation mode is switched based on a target blowout temperature TAO and the like, and a control map illustrated in FIG. 3. The operation mode includes at least a cooling mode and a dehumidifying and heating mode.

The target blowout temperature TAO is a target temperature of the blowing air blown into the cabin. The controller 60 calculates the target blowout temperature TAO based on the following formula:

$$TAO = Kset \times Tset - Kr \times Tr - Kam \times Tam - Ks \times Ts + C$$

In this formula, Tset is a set temperature in the cabin set by the temperature setting switch of the operation panel 70, Tr is an inside air temperature detected by the inside air temperature sensor 61, Tam is an outside air temperature detected by the outside air temperature sensor 62, and Ts is the solar radiation amount detected by the solar radiation amount sensor 63. Kset, Kr, Kam, and Ks are control gains, and C is a constant for correction.

In the low-temperature range of the target blowout temperature TAO, the mode is switched to the cooling mode. In the high-temperature range of the target blowout temperature TAO, the mode is switched to the dehumidifying and heating mode.

In the dehumidifying and heating mode, the air blown into the cabin is cooled and dehumidified in the air-side evaporator 14, and the air cooled and dehumidified in the air-side evaporator 14 is heated in the heater core 22 to dehumidify and heat the cabin.

When the air conditioner switch of the operation panel 70 is turned off by the occupant and the target blowout temperature TAO is in the high-temperature range, the controller 60 switches the mode to the heating mode.

In the heating mode, the air blown into the cabin is heated in the heater core 22 without being cooled or dehumidified in the air-side evaporator 14, thereby heating the cabin.

Next, operations in the cooling mode, the dehumidifying and heating mode, and the heating mode will be described. In the cooling mode, the dehumidifying and heating mode, and the heating mode, the controller 60 determines the operation states of various control devices connected to the controller 60 (i.e., control signals output to the various control devices) based on the target blowout temperature TAO, the detection signals of the group of various control sensors described above, and the like.

(1) Cooling Mode

In the cooling mode, the controller 60 operates the compressor 11 and the high-temperature-side pump 21. In the cooling mode, the controller 60 opens the first expansion valve 13 at the throttle opening and closes the second expansion valve 16. In the cooling mode, the controller 60 controls the three-way valve 26 so that both the heater core flow path 20b and the radiator flow path 20c open.

Thus, in the refrigeration cycle device 10 in the cooling mode, the refrigerant flows as indicated by a thick solid line in FIG. 3, and the state of the refrigerant circulating in the cycle is changed as follows.

That is, a high-pressure refrigerant discharged from the compressor 11 flows into the condenser 12. The refrigerant flowing into the condenser 12 dissipates heat to the coolant in the high-temperature coolant circuit 20. Thus, the refrigerant is cooled and condensed in the condenser 12.

The refrigerant flowing out of the condenser 12 flows into the first expansion valve 13 and is decompressed and expanded in the first expansion valve 13 until becoming a low-pressure refrigerant. The low-pressure refrigerant decompressed in the first expansion valve 13 flows into the air-side evaporator 14 and absorbs the heat from the air blown into the cabin to evaporate. Thus, the air blown into the cabin is cooled.

The refrigerant flowing out of the air-side evaporator 14 flows to the suction side of the compressor 11 and is again compressed in the compressor 11.

As described above, in the cooling mode, the low-pressure refrigerant is caused to absorb heat from the air by the air-side evaporator 14, and the cooled air can be blown out into the cabin. It is thereby possible to realize cooling in the cabin.

Figure 3:
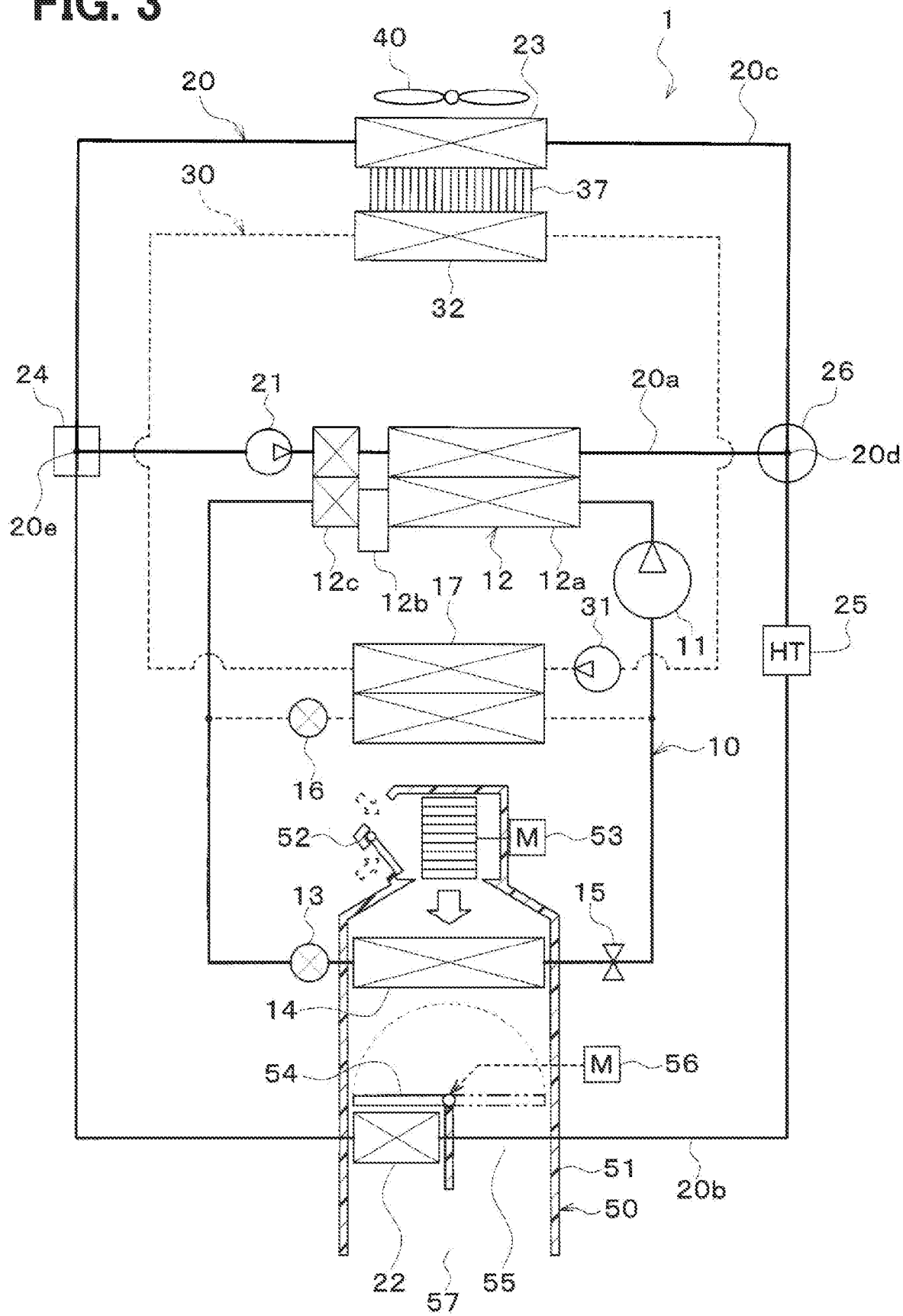
FIG. 3 is an overall configuration diagram illustrating an operation state of the refrigeration cycle device according to the first embodiment in a cooling mode.

In the high-temperature coolant circuit 20 in the cooling mode, as indicated by the thick solid line in FIG. 3, the coolant in the high-temperature coolant circuit 20 circulates to the high-temperature-side radiator 23, and heat is dissipated from the coolant to the outside air by the high-temperature-side radiator 23.

At this time, as indicated by the thick solid line in FIG. 3, the coolant in the high-temperature coolant circuit 20 also circulates to the heater core 22, and the amount of heat radiation from the coolant to the air in the heater core 22 is regulated by the air-mix door 54.

A control signal to be output to the servomotor of the air-mix door 54 is determined so that the air conditioning air regulated in temperature by the air-mix door 54 becomes the target blowout temperature TAO. Specifically, the opening of the air-mix door 54 is determined based on the target blowout temperature TAO, the temperature of the air-side evaporator 14, the temperature TW of the coolant in the high-temperature coolant circuit 20, and the like.

(2) Dehumidifying and Heating Mode

In the dehumidifying and heating mode, the controller 60 operates the compressor 11, the high-temperature-side pump 21, and the low-temperature-side pump 31. In the dehumidifying and heating mode, the controller 60 opens the first expansion valve 13 and the second expansion valve 16 at the throttle opening. In the dehumidifying and heating mode, the controller 60 controls the three-way valve 26 so that the heater core flow path 20b opens and the radiator flow path 20c closes.

In the refrigeration cycle device 10 in the dehumidifying and heating mode, the refrigerant flows as indicated by a thick solid line in FIG. 4, and the state of the refrigerant circulating in the cycle is changed as follows.

Figure 4:
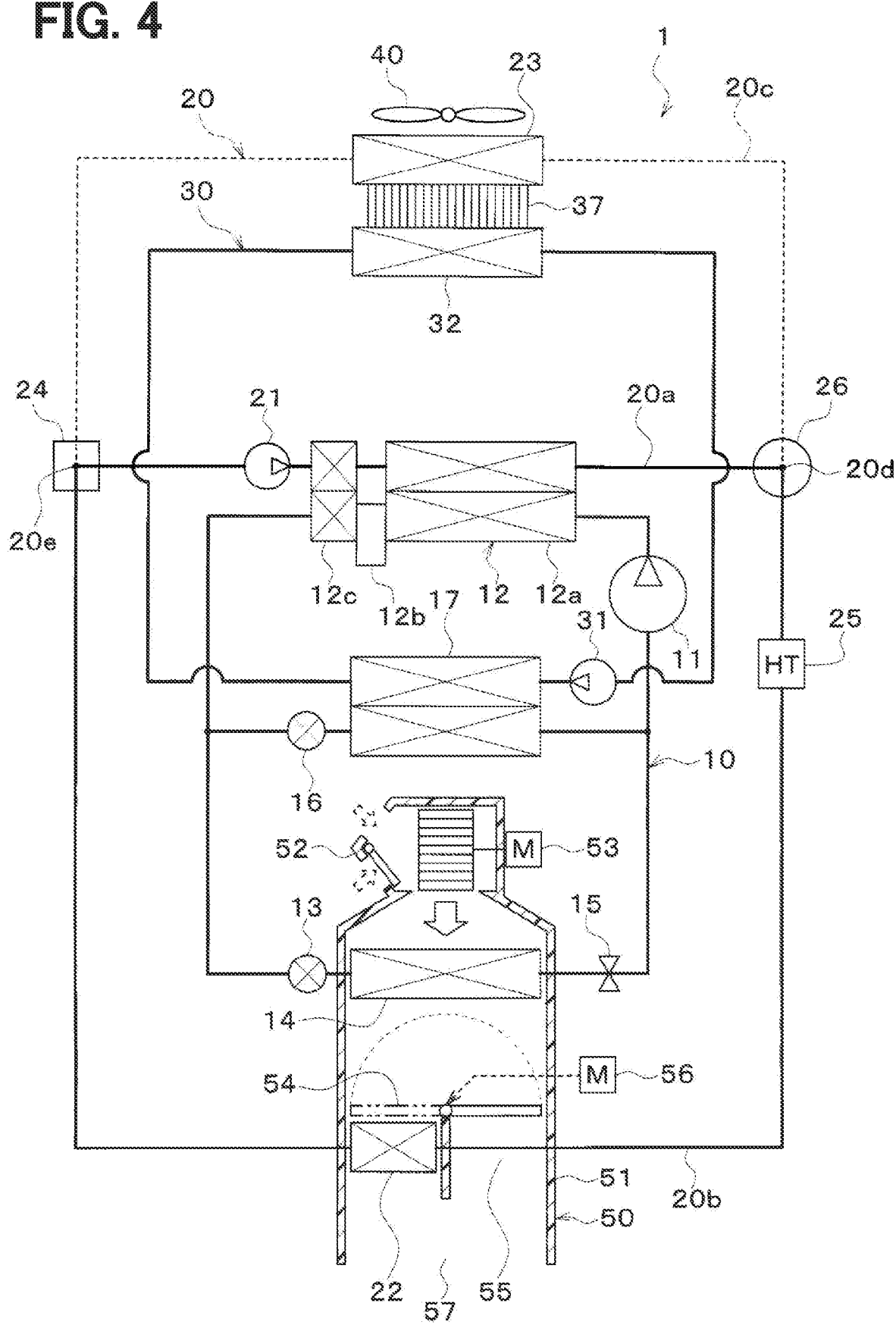
FIG. 4 is an overall configuration diagram illustrating an operation state of the refrigeration cycle device according to the first embodiment in a dehumidifying and heating mode.

That is, in the refrigeration cycle device 10, as indicated by the thick solid line in FIG. 4, the high-pressure refrigerant discharged from the compressor 11 flows into the condenser 12 and exchanges heat with the coolant in the high-temperature coolant circuit 20 to dissipate heat. Thus, the coolant in the high-temperature coolant circuit 20 is heated.

The refrigerant flowing out of the condenser 12 flows into the first expansion valve 13 and is decompressed and expanded in the first expansion valve 13 until becoming a low-pressure refrigerant. The low-pressure refrigerant decompressed in the first expansion valve 13 flows into the air-side evaporator 14 and absorbs the heat from the air blown into the cabin to evaporate. Thus, the air blown into the cabin is cooled and dehumidified.

The refrigerant flowing out of the air-side evaporator 14 flows to the suction side of the compressor 11 and is again compressed in the compressor 11.

At the same time, in the refrigeration cycle device 10, as indicated by the thick solid line in FIG. 4, the refrigerant flowing out of the condenser 12 flows into the second expansion valve 16 and is decompressed and expanded in the second expansion valve 16 until becoming a low-pressure refrigerant. The low-pressure refrigerant decompressed in the second expansion valve 16 flows into the coolant-side evaporator 17 and absorbs heat from the coolant of the low-temperature coolant circuit 30 to evaporate. Thus, the coolant of the low-temperature coolant circuit 30 is cooled.

The refrigerant flowing out of the coolant-side evaporator 17 flows to the suction side of the compressor 11 and is compressed again by the compressor 11.

The high-temperature coolant circuit 20 in the dehumidifying and heating mode is in a first state indicated by the thick solid line in FIG. 4. In the first state, the coolant in the high-temperature coolant circuit 20 circulates between the condenser 12 and the heater core 22, but the coolant in the high-temperature coolant circuit 20 does not circulate to the high-temperature-side radiator 23.

The control signal to be output to the servomotor of the air-mix door 54 is determined so that the air-mix door 54 is located at the solid-line position in FIG. 4 to fully open the air passage of the heater core 22, and the total flow rate of the ventilation air having passed through the air-side evaporator 14 passes through the heater core 22.

Thereby, in the heater core 22, heat is dissipated from the coolant in the high-temperature coolant circuit 20 to the air blown into the cabin. Hence the air cooled and dehumidified in the air-side evaporator 14 is heated in the heater core 22 and blown out into the cabin.

At this time, with the three-way valve 26 closing the radiator flow path 20c, the coolant in the high-temperature coolant circuit 20 does not circulate to the high-temperature-side radiator 23. Thus, heat is not dissipated from the coolant to the outside air in the high-temperature-side radiator 23.

In the low-temperature coolant circuit 30 in the dehumidifying and heating mode, as indicated by the thick solid line in FIG. 4, the coolant of the low-temperature coolant circuit 30 circulates to the low-temperature-side radiator 32, and heat is absorbed from the outside air into the coolant of the low-temperature coolant circuit 30 in the low-temperature-side radiator 32.

As thus described, in the dehumidifying and heating mode, the heat of the high-pressure refrigerant discharged from the compressor 11 is dissipated to the coolant in the high-temperature coolant circuit 20 in the condenser 12, the heat of the coolant in the high-temperature coolant circuit 20 is dissipated in the air in the heater core 22, and the air heated in the heater core 22 can be blown out into the cabin.

In the heater core 22, the air cooled and dehumidified in the air-side evaporator 14 is heated. Thus, it is possible to realize dehumidification and heating in the cabin.

(3) Heating Mode

In the heating mode, the controller 60 operates the compressor 11 and the high-temperature-side pump 21. In the heating mode, the controller 60 doses the first expansion valve 13 and opens the second expansion valve 16 at the throttle opening. In the heating mode, the controller 60 controls the three-way valve 26 so that the heater core flow path 20b opens and the radiator flow path 20c closes.

In the refrigeration cycle device 10 in the heating mode, the refrigerant flows as indicated by a thick solid line in FIG. 5, and the state of the refrigerant circulating in the cycle is changed as follows.

Figure 5:
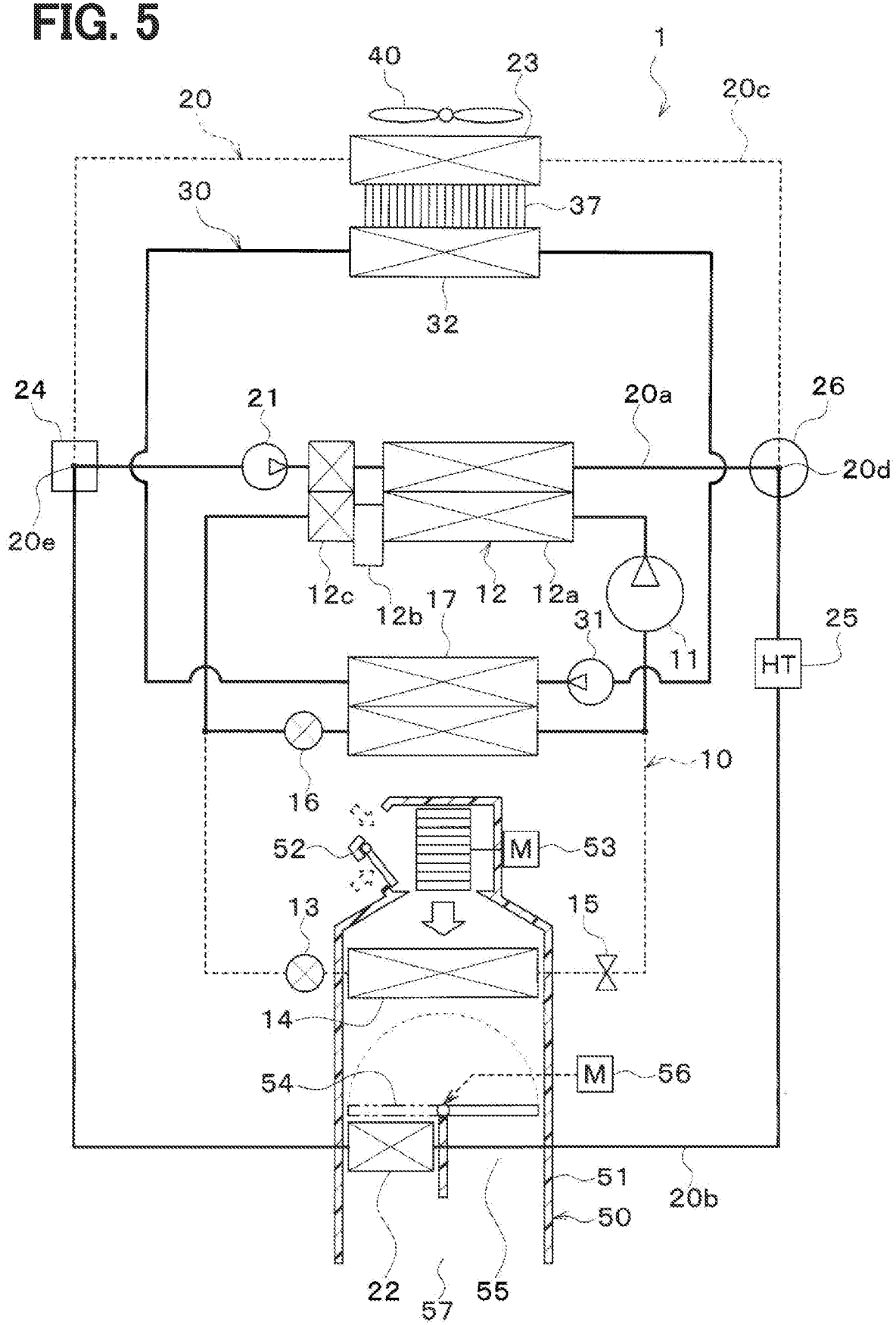
FIG. 5 is an overall configuration diagram illustrating an operation state of the refrigeration cycle device according to the first embodiment in a heating mode.

That is, in the refrigeration cycle device 10, as indicated by the thick solid line in FIG. 5, the refrigerant flowing out of the condenser 12 flows into the second expansion valve 16 and is decompressed and expanded in the second expansion valve 16 until becoming a low-pressure refrigerant. The low-pressure refrigerant decompressed in the second expansion valve 16 flows into the coolant-side evaporator 17 and absorbs heat from the coolant of the low-temperature coolant circuit 30 to evaporate. Thus, the coolant of the low-temperature coolant circuit 30 is cooled.

At this time, with the first expansion valve 13 being closed, the refrigerant does not flow to the air-side evaporator 14, Hence the air is not cooled or dehumidified in the air-side evaporator 14.

The high-temperature coolant circuit 20 in the heating mode is in the first state indicated by the thick solid line in FIG. 5. In the first state, the coolant in the high-temperature coolant circuit 20 circulates between the condenser 12 and the heater core 22, but the coolant in the high-temperature coolant circuit 20 does not circulate to the high-temperature-side radiator 23.

The control signal to be output to the servomotor of the air-mix door 54 is determined so that the air-mix door 54 is located at the solid-line position in FIG. 5 to fully open the air passage of the heater core 22, and the total flow rate of the ventilation air having passed through the air-side evaporator 14 passes through the heater core 22.

Thereby, in the heater core 22, heat is dissipated from the coolant in the high-temperature coolant circuit 20 to the air blown into the cabin. Hence the air having passed through the air-side evaporator 14 (i.e., the air not cooled or dehumidified in the air-side evaporator 14) is heated in the heater core 22 and blown into the cabin.

At this time, with the three-way valve 26 dosing the radiator flow path 20c, the coolant in the high-temperature coolant circuit 20 does not circulate to the high-temperature-side radiator 23. Thus, heat is not dissipated from the coolant to the outside air in the high-temperature-side radiator 23.

In the low-temperature coolant circuit 30 in the heating mode, as indicated by the thick solid line in FIG. 5, the coolant of the low-temperature coolant circuit 30 circulates to the low-temperature-side radiator 32, and heat is absorbed from the outside air into the coolant of the low-temperature coolant circuit 30 in the low-temperature-side radiator 32.

As thus described, in the heating mode, the heat of the high-pressure refrigerant discharged from the compressor 11 is dissipated to the coolant in the high-temperature coolant circuit 20 in the condenser 12, the heat of the coolant in the high-temperature coolant circuit 20 is dissipated in the air in the heater core 22, and the air heated in the heater core 22 can be blown out into the cabin.

In the heater core 22, the air having passed through the air-side evaporator 14 without being cooled or dehumidified in the air-side evaporator 14 is heated. It is thereby possible to realize cooling in the cabin.

(4) Defrosting Mode

In the defrosting mode, the low-temperature-side radiator 32 is defrosted after the dehumidifying and heating mode or after the heating mode. In the dehumidifying and heating mode or the heating mode, the coolant of the low-temperature coolant circuit 30 is absorbed from the outside air in the low-temperature-side radiator 32, whereby frosting occurs in the low-temperature-side radiator 32 when the temperature of the low-temperature-side radiator 32 falls below zero. Therefore, when the vehicle stops after the execution of the dehumidifying and heating mode, the heat remaining in the coolant in the high-temperature coolant circuit 20 is utilized to defrost the low-temperature-side radiator 32.

Specifically, in the defrosting mode, the controller 60 operates the high-temperature-side pump 21 to stop the compressor 11, the low-temperature-side pump 31, the outside blower 40, and the inside blower 53. In the dehumidifying and heating mode, the controller 60 controls the three-way valve 26 so as to open both the heater core flow path 20b and the radiator flow path 20c.

With the compressor 11 being stopped, the refrigerant does not flow in the refrigeration cycle device 10 in the defrosting mode. With the low-temperature-side pump 31 being stopped, the coolant does not circulate in the low-temperature coolant circuit 30 in the defrosting mode.

Figure 6:
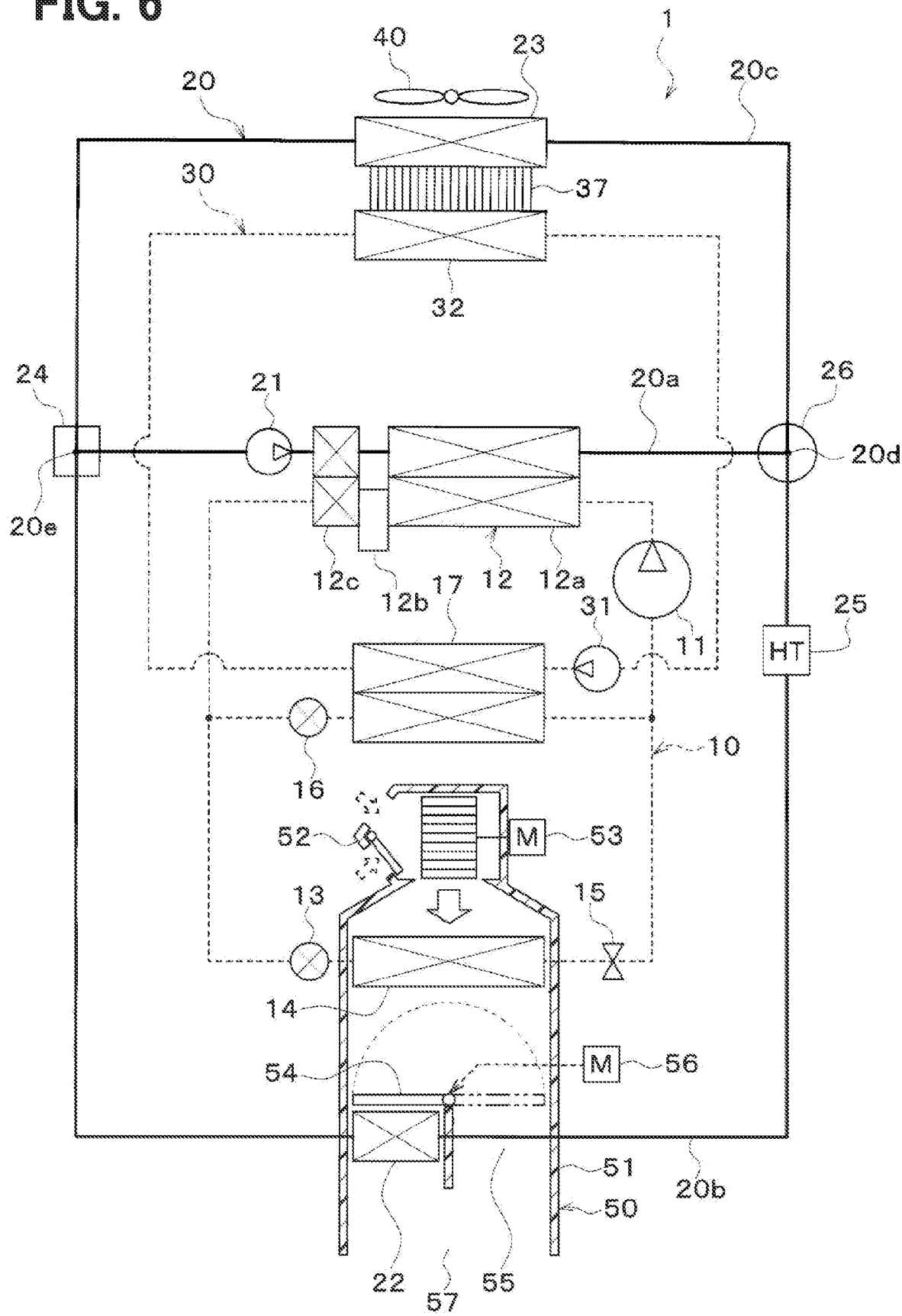
FIG. 6 is an overall configuration diagram illustrating an operation state of the refrigeration cycle device according to the first embodiment in a defrosting mode.

The high-temperature coolant circuit 20 in the dehumidifying and heating mode is in a second state indicated by a thick solid line in FIG. 6. In the second state, the coolant in the high-temperature coolant circuit 20 circulates between the condenser 12, the heater core 22, and the high-temperature-side radiator 23.

Specifically, the coolant discharged from the high-temperature-side pump 21 passes through the condenser 12, branches into the heater core 22 side and the high-temperature-side radiator 23 side at the branching part 20d, flows through the heater core 22 and the high-temperature-side radiator 23 in parallel, merges at the merging part 20e, and is sucked into the high-temperature-side pump 21. As a result, the high-temperature coolant in the condenser 12 flows into the high-temperature-side radiator 23.

With the inside blower 53 being stopped, the air does not flow to the heater core 22. Thus, the high-temperature coolant in the heater core 22 flows into the high-temperature-side radiator 23 without being cooled by air.

With the outside blower 40 being stopped, the air does not flow to the high-temperature-side radiator 23. Thus, in the high-temperature-side radiator 23, the coolant is not cooled by the outside air.

That is, since the high-temperature-side radiator 23 and the low-temperature-side radiator 32 are connected to each other by the common fin 37 so as to be heat-transferable, the heat of coolant in the high-temperature coolant circuit 20 flowing in the high-temperature-side radiator 23 transfers to the low-temperature-side radiator 32 via the fin 37.

In this manner, the frost adhering to the surface of the low-temperature-side radiator 32 can be melted by the heat supplied to the low-temperature-side radiator 32.

That is, in the defrosting mode, the radiator flow path 20c, the high-temperature-side radiator 23, and the fins 37 are a heat supply unit for supplying the heat of the coolant heated in the condenser 12 to the low-temperature-side radiator 32.

Since the heat of the coolant transfers to the low-temperature-side radiator 32 in the high-temperature-side radiator 23, the coolant is cooled in the high-temperature-side radiator 23. The coolant cooled in the high-temperature-side radiator 23 merges with the coolant flowing out of the heater core 22 at the merging part 20e and then flows into the condenser 12.

By the circulation of the coolant in this manner, the heat of each of the condenser 12 and the condenser flow path 20a can be effectively utilized for defrosting, and the heat of each of the coolant of the heater core 22 and the heater core flow path 20b can also be effectively utilized for defrosting.

With the reserve tank 24 being disposed at the merging part 20e, the coolant cooled in the high-temperature-side radiator 23 and the coolant flowing out of the heater core 22 are mixed in the reserve tank 24 and flow into the condenser 12. The coolant flow path in the reserve tank 24 is a complicated flow path for separating coolant into gas and liquid. Therefore, the coolant cooled in the high-temperature-side radiator 23 and the coolant flowing out of the heater core 22 are well mixed in the reserve tank 24 and flow into the condenser 12, so that the temperature distribution of the coolant flowing into the condenser 12 can be reduced.

Figure 7:
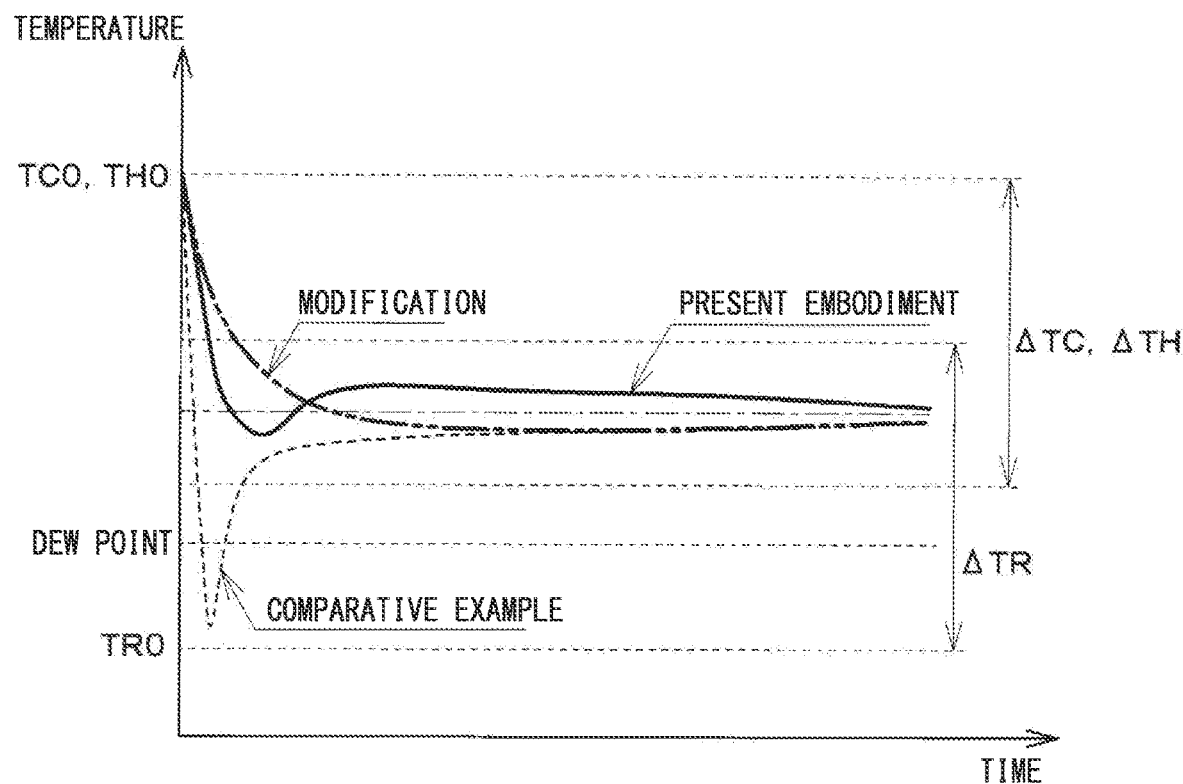
FIG. 7 is a graph illustrating a time change in a temperature of coolant in a high-temperature coolant circuit of the refrigeration cycle device according to the first embodiment in the defrosting mode.

At this time, the controller 60 controls the three-way valve 26 so that the temperature of the coolant in the high-temperature coolant circuit 20 (specifically, the coolant temperature detected in the high-temperature coolant temperature sensor 64) changes with time as indicated by a thick solid line in a graph of FIG. 7.

Specifically, by performing the following control (1) to (6), it is possible to prevent a rapid temperature decrease in the coolant in the high-temperature coolant circuit 20 as in a comparative example indicated by a broken line in the graph of FIG. 7. That is, as indicated by the thick solid line in the graph of FIG. 7, the temperature of the coolant in the high-temperature coolant circuit 20 can be lowered gently.

(1) When the dehumidifying and heating mode or the heating mode is switched to the defrosting mode, the controller 60 controls the three-way valve 26 so that the flow rate of the coolant flowing into the high-temperature-side radiator 23 becomes smaller than the flow rate of the coolant flowing into the heater core 22.

(2) When the dehumidifying and heating mode or the heating mode is switched to the defrosting mode, the controller 60 controls the three-way valve 26 so that the flow rate of the coolant flowing into the high-temperature-side radiator 23 gradually increases with the lapse of time.

(3) The controller 60 controls the three-way valve 26 so that the temperature of the coolant flowing into the heater core 22 becomes higher than the dew point temperature at the heater core 22 when the dehumidifying and heating mode or the heating mode is switched to the defrosting mode.

(4) The controller 60 controls the three-way valve 26 so that the temperature difference between the temperature of the coolant in the high-temperature coolant circuit 20 in the defrosting mode and a temperature TR0 of the low-temperature-side radiator 32 at the time of switching to the defrosting mode falls within an allowable range ΔTR.

(5) The controller 60 controls the three-way valve 26 so that the temperature difference between the temperature of the coolant in the high-temperature coolant circuit 20 in the defrosting mode and a temperature TC0 of condenser 12 at the time of switching to the defrosting mode falls within an allowable range ΔTC.

(6) The controller 60 controls the three-way valve 26 so that the temperature difference between the temperature of the coolant in the high-temperature coolant circuit 20 in the defrosting mode and a temperature TH0 of the heater core 22 at the time of switching to the defrosting mode falls within an allowable range ΔTH.

Therefore, it is possible to reduce heat shock in each of the low-temperature-side radiator 32, the condenser 12, and the heater core 22 when the dehumidifying and heating mode or the heating mode is switched to the defrosting mode.

That is, it is possible to reduce heat shock that the low-temperature-side radiator 32 is rapidly heated by the heat from the high-temperature-side radiator 23 when the dehumidifying and heating mode or the heating mode is switched to the defrosting mode. It is possible to reduce heat shock that the condenser 12 and the heater core 22 are rapidly cooled by the coolant cooled in the high-temperature-side radiator 23 when the dehumidifying and heating mode or the heating mode is switched to the defrosting mode.

Since the flow rate of the coolant flowing into the high-temperature-side radiator 23 is gradually increased with the lapse of time, the low-temperature-side radiator 32 can be defrosted as quickly as possible while the heat shock is reduced.

Since the temperature of the coolant flowing into the condenser 12 is made higher than the dew point temperature in the condenser 12, dew condensation on the condenser 12 in the defrosting mode can be reduced.

Since the temperature of the coolant flowing into the heater core 22 is made higher than the dew point temperature at the heater core 22, dew condensation on the heater core 22 in the defrosting mode can be reduced.

As a modification of the present embodiment, the controller 60 may reduce the output of the high-temperature-side pump 21 when the dehumidifying and heating mode or the heating mode is switched to the defrosting mode. Accordingly, the flow rate of the coolant in the high-temperature coolant circuit 20 in the defrosting mode is reduced, whereby the temperature of the coolant in the high-temperature coolant circuit 20 changes with time as indicated by a thick two-dot chain line in the graph of FIG. 7.

That is, it is possible to reduce the time change rate in the temperature of the coolant in the high-temperature coolant circuit 20 immediately after the mode is switched to the defrosting mode. For example, the time change rate in the temperature of the coolant in the high-temperature coolant circuit 20 means a coolant temperature change rate per time immediately after the mode is switched to the defrosting mode. Therefore, since the temperature of the coolant in the high-temperature coolant circuit 20 can be further gradually lowered, the heat shock can be further reduced.

In the defrosting mode, the controller 60 may operate the electric heater 25. As a result, the coolant in the high-temperature coolant circuit 20 is heated, so that the defrosting can be performed more quickly.

Since the coolant flowing into the heater core 22 is heated, it is possible to prevent the temperature of the coolant flowing into the heater core 22 from becoming excessively low even when the heat of the coolant is used for defrosting. Hence the heat shock in the heater core 22 can be further reduced.

Figure 8:
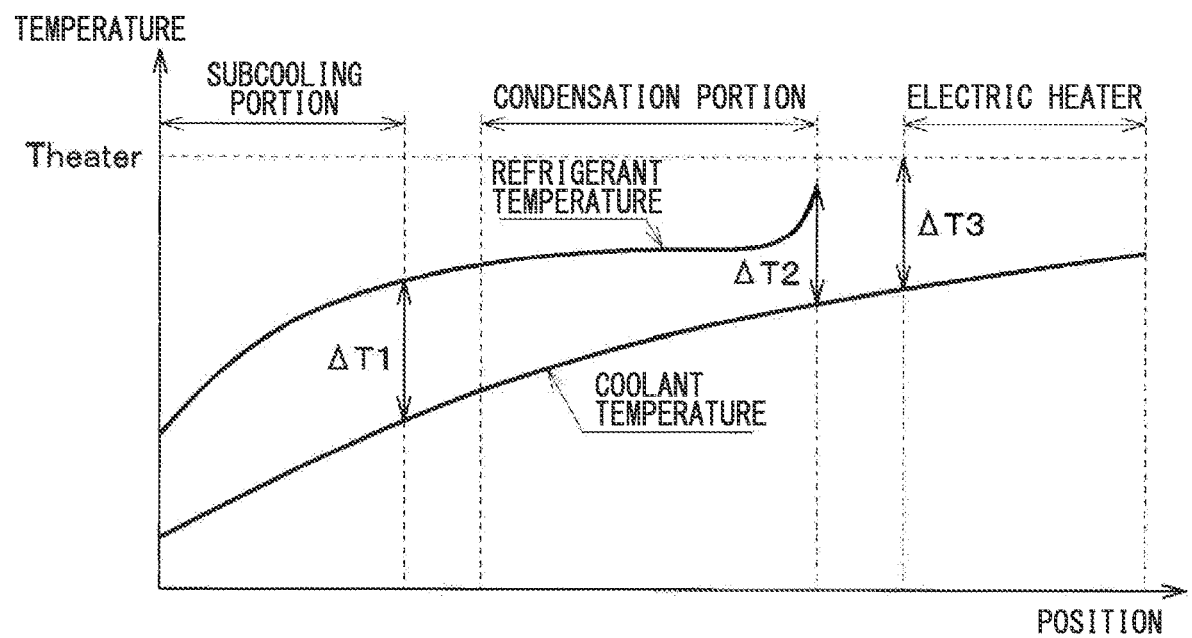
FIG. 8 is a graph illustrating temperature changes of a refrigerant and coolant in a coolant flow direction in a high-temperature coolant circuit of the refrigeration cycle device according to the first embodiment in the defrosting mode.

FIG. 8 illustrates a temperature change of the coolant in the coolant flow direction in the high-temperature coolant circuit 20 at this time.

The electric heater 25 is often higher in temperature than the condenser 12. In view of this point, the electric heater 25 is disposed on the downstream side of the condenser 12 in the refrigerant flow, whereby it is possible to effectively heat the coolant.

In the condenser 12, the coolant flows in the order of the subcooling portion 12c and the condensation portion 12a, contrary to the refrigerant. Therefore, as illustrated in FIG. 8, a temperature difference ΔT1 between the refrigerant and the coolant in the subcooling portion 12c and a temperature difference ΔT2 between the refrigerant and the coolant in the condensation portion 12a can be made small. With the electric heater 25 being disposed on the refrigerant flow downstream side of the condenser 12, a temperature difference ΔT3 between the electric heater 25 and the coolant can be made small.

In the present embodiment, the coolant flowing out of the condenser 12 is branched into the heater core 22 side and the high-temperature-side radiator 23 side at the branching part 20d. The coolant having passed through the heater core 22 and the coolant having passed through the high-temperature-side radiator 23 are joined at the merging part 20e. The three-way valve 26 switches between the dehumidifying and heating mode or heating mode and the defrosting mode.

Accordingly, when the dehumidifying and heating mode or the heating mode is switched to the defrosting mode, the high-temperature coolant in the condenser 12 flows while being branched into the heater core 22 side and the high-temperature-side radiator 23 side, and the low-temperature coolant having passed through the high-temperature-side radiator 23 merges with the high-temperature coolant having passed through the heater core 22 and flows into the condenser 12.

Therefore, the flow rate of the coolant flowing into the high-temperature-side radiator 23 can be reduced, and the temperature of the coolant flowing into the condenser 12 can be made higher than the temperature of the coolant having passed through the high-temperature-side radiator 23.

It is thus possible to reduce the heat shock in each of the low-temperature-side radiator 32 and the condenser 12 when the defrosting of the low-temperature-side radiator 32 is started by switching the dehumidifying and heating mode or the heating mode to the defrosting mode.

In the present embodiment, when the dehumidifying and heating mode or the heating mode is switched to the defrosting mode, the controller 60 controls the three-way valve 26 so that the flow rate of the coolant flowing toward the high-temperature-side radiator 23 becomes smaller than the flow rate of the coolant flowing toward the heater core 22.

Hence the flow rate of the coolant flowing into the high-temperature-side radiator 23 when the dehumidifying and heating mode or the heating mode is switched to the defrosting mode can be reduced reliably, whereby the heat shock in each of the low-temperature-side radiator 32 and the condenser 12 when the defrosting of the low-temperature-side radiator 32 is started can be reduced reliably.

In the present embodiment, when the dehumidifying and heating mode or the heating mode is switched to the defrosting mode, the controller 60 increases the flow rate of the coolant flowing toward the high-temperature-side radiator 23 with the lapse of time. This makes it possible to defrost the low-temperature-side radiator 32 as quickly as possible while reducing the heat shock.

In the present embodiment, in the defrosting mode, the controller 60 controls the three-way valve 26 so that the temperature of the coolant flowing into the condenser 12 becomes higher than the dew point temperature at the condenser 12. This can reduce dew condensation on the condenser 12 in the defrosting mode.

In the present embodiment, in the defrosting mode, the controller 60 controls the three-way valve 26 so that the temperature of the coolant flowing into the heater core 22 becomes higher than the dew point temperature at the heater core 22. This can reduce dew condensation on the heater core 22 in the defrosting mode can be reduced.

In the present embodiment, the controller 60 controls the three-way valve 26 so that the temperature difference between the temperature of the coolant in the defrosting mode and the temperature of the low-temperature-side radiator 32 at the time of switching to the defrosting mode falls within a predetermined range.

It is thereby possible to reliably reduce the heat shock in the low-temperature-side radiator 32 when the defrosting of the low-temperature-side radiator 32 is started.

In the present embodiment, the condenser 12 has a structure in which the refrigerant and the coolant flow while facing each other. Thus, the temperature difference between the refrigerant and the coolant at each portion of the condenser 12 when the defrosting of the low-temperature-side radiator 32 is started can be reduced, so that the heat shock in the condenser 12 can be further reduced.

Specifically, in the condenser 12, the coolant flows through the subcooling portion 12c and the condensation portion 12a in this order. Hence the temperature difference between the refrigerant and the coolant in the condensation portion 12a and the subcooling portion 12c when the defrosting of the low-temperature-side radiator 32 is started can be reduced, so that the heat shock in the condenser 12 can be further reduced.

In the present embodiment, since the electric heater 25 is disposed on the downstream side of the branching part and on the upstream side of the heat utilization unit in the flow of the coolant, the coolant can be efficiently heated in the electric heater 25 having a temperature higher than that of the condenser 12.

In the present embodiment, the high-temperature-side pump 21 is disposed on the downstream side of the merging part 20e and on the upstream side of the branching part 20d in the flow of the coolant. This can maximize the number of pumps in the high-temperature coolant circuit 20.

In the present embodiment, when the dehumidifying and heating mode or the heating mode is switched to the defrosting mode, the controller 60 controls the high-temperature-side pump 21 so that the time change rate in the temperature of the coolant flowing into condenser 12 decreases.

Accordingly, the flow rate of the coolant in the high-temperature coolant circuit 20 in the defrosting mode can be reduced, whereby the time change rate in the temperature of the coolant in the high-temperature coolant circuit 20 immediately after the mode is switched to the defrosting mode can be reduced. Therefore, since the temperature of the coolant in the high-temperature coolant circuit 20 can be further gradually lowered, the heat shock can be further reduced.

In the present embodiment, the reserve tank 24 is disposed on the downstream side of the merging part 20e and on the upstream side of the condenser 12, or at the merging part 20e.

Accordingly, in the defrosting mode, the coolant cooled in the high-temperature-side radiator 23 and the coolant flowing out of the heater core 22 are well mixed in the reserve tank 24 and flow into the condenser 12, so that the temperature distribution of the coolant flowing into the condenser 12 can be reduced.

Second Embodiment

Figure 9:
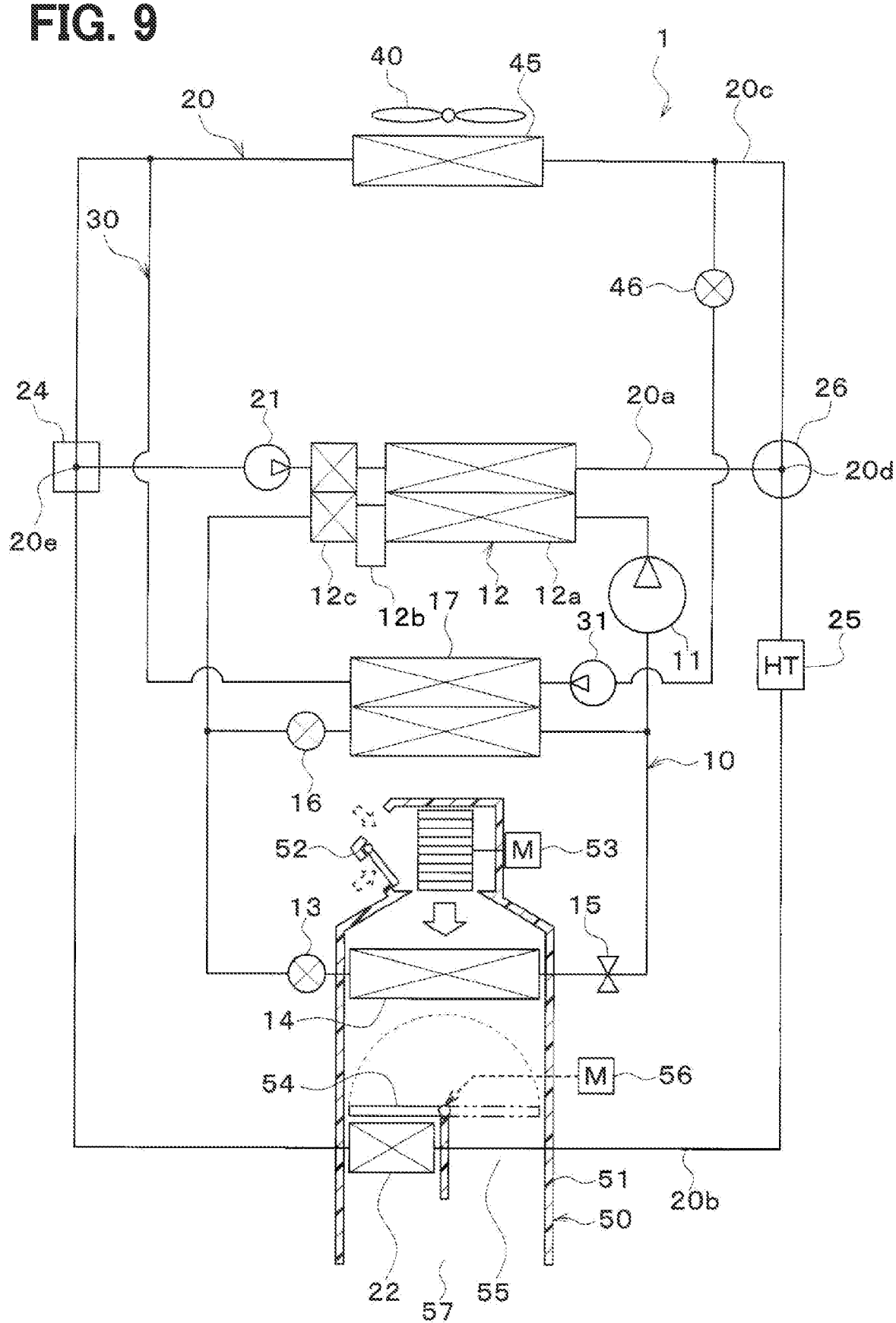
FIG. 9 illustrates an overall configuration diagram of a refrigeration cycle device according to a second embodiment.

In the first embodiment, the high-temperature-side radiator 23 is disposed in the high-temperature coolant circuit 20, and the low-temperature-side radiator 32 is disposed in the low-temperature coolant circuit 30. However, in the present embodiment, as illustrated in FIG. 9, a common radiator 45 is disposed in the high-temperature coolant circuit 20 and the low-temperature coolant circuit 30. The common radiator 45 is a radiator common to the high-temperature coolant circuit 20 and the low-temperature coolant circuit 30.

Both the coolant in the radiator flow path 20c of the high-temperature coolant circuit 20 and the coolant in the low-temperature coolant circuit 30 can flow through the common radiator 45.

The common radiator 45 exchanges heat between the coolant and the outside air. The common radiator 45 and the outside blower 40 are disposed in the foremost part of the vehicle. Therefore, when the vehicle is traveling, the traveling air can be applied to the common radiator 45.

An on-off valve 46 that opens and closes a coolant flow path to the common radiator 45 is disposed in the low-temperature coolant circuit 30. The on-off operation of the on-off valve 46 is controlled by the controller 60.

In the cooling mode, the controller 60 controls the three-way valve 26 so that the coolant in the radiator flow path 20c of the high-temperature coolant circuit 20 flows through the common radiator 45, and closes the on-off valve 46 so that the coolant in the low-temperature coolant circuit 30 does not flow through the common radiator 45.

Thereby, in the cooling mode, the common radiator 45 dissipates heat from the coolant in the radiator flow path 20c of the high-temperature coolant circuit 20 to the outside air.

In the dehumidifying and heating mode, the controller 60 controls the three-way valve 26 so that the coolant in the radiator flow path 20c of the high-temperature coolant circuit 20 does not flow through the common radiator 45, and opens the on-off valve 46 so that the coolant in the low-temperature coolant circuit 30 flows through the common radiator 45.

Thereby, in the dehumidifying and heating mode, the coolant in the low-temperature coolant circuit 30 absorbs heat from the outside air in the common radiator 45. In the dehumidifying and heating mode, the coolant-side evaporator 17 and the common radiator 45 are heat absorption units that evaporate the refrigerant decompressed in the second expansion valve 16 to absorb heat.

In the heating mode, the controller 60 controls the three-way valve 26 so that the coolant in the radiator flow path 20c of the high-temperature coolant circuit 20 does not flow through the common radiator 45, and opens the on-off valve 46 so that the coolant in the low-temperature coolant circuit 30 flows through the common radiator 45.

Thereby, in the heating mode, the coolant in the low-temperature coolant circuit 30 absorbs heat from the outside air in the common radiator 45. In the heating mode, the coolant-side evaporator 17 and the common radiator 45 are heat absorption units that evaporate the refrigerant decompressed in the second expansion valve 16 to absorb heat.

In the defrosting mode, the controller 60 controls the three-way valve 26 so that the coolant in the radiator flow path 20c of the high-temperature coolant circuit 20 flows through the common radiator 45, and closes the on-off valve 46 so that the coolant in the low-temperature coolant circuit 30 does not flow through the common radiator 45.

Thereby, in the defrosting mode, the common radiator 45 is defrosted by the heat of the coolant in the radiator flow path 20c of the high-temperature coolant circuit 20. In the defrosting mode, the radiator flow path 20c is a heat supply unit for supplying the heat of the coolant heated in the condenser 12 to the common radiator 45.

In the present embodiment as well, the same effect as that of the above embodiment can be obtained. That is, it is possible to reduce the heat shock in each of the common radiator 45 and the condenser 12 when the dehumidifying and heating mode or the heating mode is switched to the defrosting mode.

Third Embodiment

Figure 10:
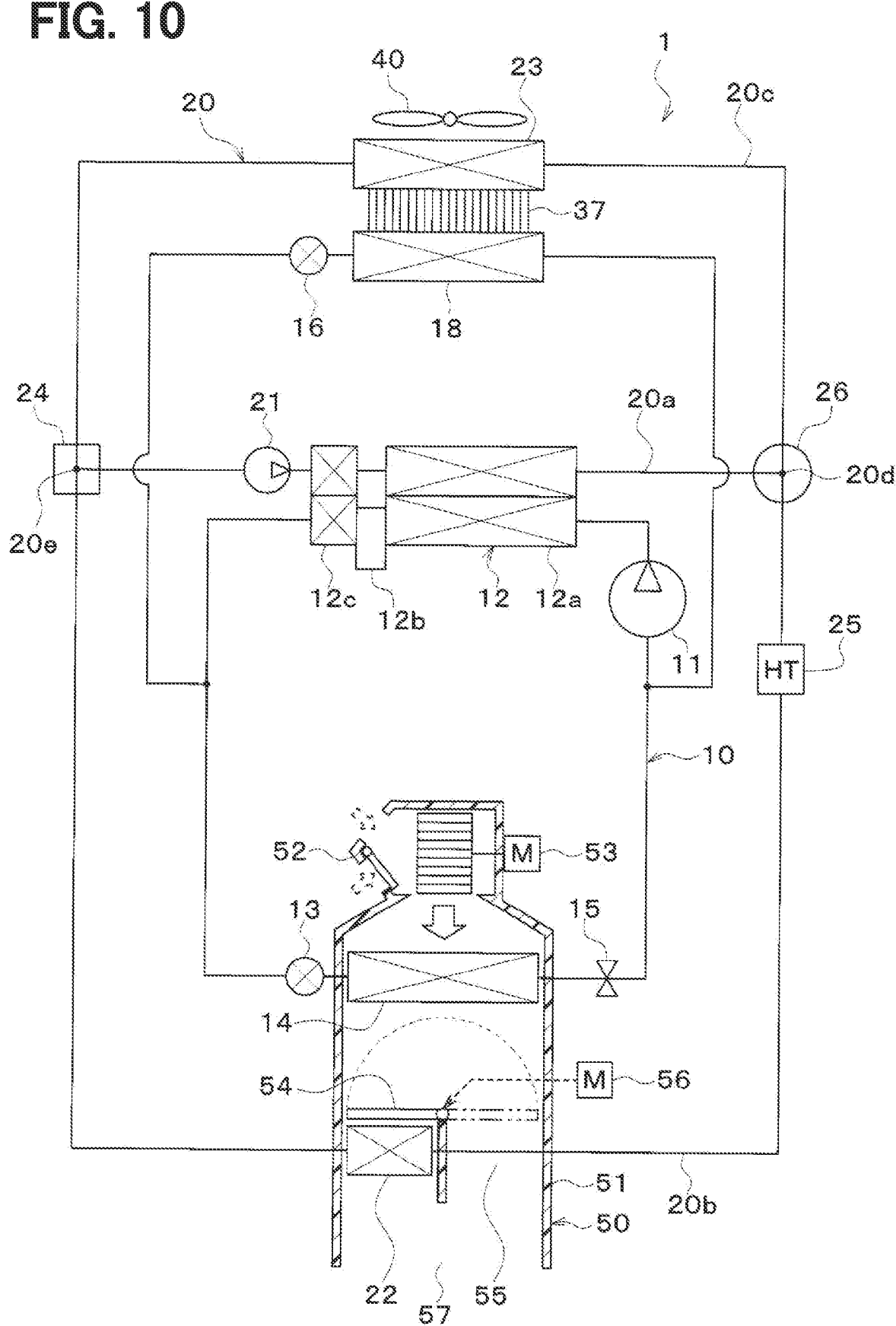
FIG. 10 illustrates an overall configuration diagram of a refrigeration cycle device according to a third embodiment.

In the first embodiment, the refrigerant decompressed in the second expansion valve 16 absorbs heat from the outside air via the coolant in the low-temperature coolant circuit 30. However, in the present embodiment, as illustrated in FIG. 10, the refrigerant decompressed in the second expansion valve 16 absorbs heat from the outside air without the use of the coolant.

The refrigeration cycle device 10 includes an exterior evaporator 18. The exterior evaporator 18 exchanges heat between the refrigerant flowing out of the second expansion valve 16 and the outside air to cause the refrigerant to absorb heat from the outside air, thereby evaporating the refrigerant. The exterior evaporator 18 is a heat absorption unit that evaporates the refrigerant decompressed in the second expansion valve 16 to absorb heat.

The exterior evaporator 18 is joined to the high-temperature-side radiator 23 by the common fin 37. The exterior evaporator 18, the high-temperature-side radiator 23, and the outside blower 40 are disposed in the foremost part of the vehicle. Accordingly, during the traveling of the vehicle, the traveling air can be applied to the exterior evaporator 18 and the high-temperature-side radiator 23.

In the present embodiment as well, the cooling mode, the dehumidifying and heating mode, the heating mode, and the defrosting mode are switched as in the first embodiment. Therefore, the same effect as that of the first embodiment can be obtained.

The present disclosure is not limited to the embodiments described above but can be variously modified as follows without departing from the spirit of the present disclosure.

In the above embodiment, the coolant is used as the heat medium, but various media such as oil may be used as the heat medium. A nanofluid may be used as the heat medium. A nanofluid is a fluid in which nanoparticles of the order of nanometers in diameter are mixed.

In the refrigeration cycle device 10 of the above embodiment, a fluorocarbon refrigerant is used as the refrigerant, but the type of the refrigerant is not limited thereto, and a natural refrigerant such as carbon dioxide or a hydrocarbon refrigerant may be used.

The refrigeration cycle device 10 of the above embodiment constitutes a subcritical refrigeration cycle in which the pressure of the high-pressure-side refrigerant does not exceed the critical pressure of the refrigerant but may constitute a supercritical refrigeration cycle in which the pressure of the high-pressure-side refrigerant exceeds the critical pressure of the refrigerant.

In the first embodiment, the high-temperature-side radiator 23 and the low-temperature-side radiator 32 are separate radiators, and the high-temperature-side radiator 23 and the low-temperature-side radiator 32 are joined to each other by the common fin 37. However, one radiator may constitute the high-temperature-side radiator 23 and the low-temperature-side radiator 32.

For example, the coolant tank of the high-temperature-side radiator 23 and the coolant tank of the low-temperature-side radiator 32 may be integrated with each other, whereby one radiator may constitute the high-temperature-side radiator 23 and the low-temperature-side radiator 32.

In the above embodiment, the electric heater 25 is disposed on the downstream side of the branching part 20*d* of the high-temperature coolant circuit 20 and on the upstream side of the heater core 22, but the position of the electric heater 25 in the high-temperature coolant circuit 20 is not limited thereto.

For example, the electric heater 25 may be disposed on the downstream side of the condenser 12 and on the upstream side of the branching part 20*d* of the high-temperature coolant circuit 20.

In the first and third embodiments, the coolant in the high-temperature coolant circuit 20 does not circulate to the high-temperature-side radiator 23 in the case of the dehumidifying and heating mode and the heating mode, but the coolant in the high-temperature coolant circuit 20 may circulate to the high-temperature-side radiator 23 at a small flow rate in the case of the dehumidifying and heating mode and the heating mode.

For example, in the case of the dehumidifying and heating mode and the heating mode, the coolant in the high-temperature coolant circuit 20 may circulate to the high-temperature-side radiator 23 at a small flow rate as compared to the defrosting mode.

In the present embodiment as well, it is possible to reduce the heat shock in each of the low-temperature-side radiator 32 and the condenser 12 when the flow rate of the coolant in the high-temperature coolant circuit 20 circulating to the low-temperature-side radiator 32 increases by switching the dehumidifying and heating mode or the heating mode to the defrosting mode.

That is, when the dehumidifying and heating mode or the heating mode is switched to the defrosting mode, the flow rate of the coolant flowing into the high-temperature-side radiator 23 can be reduced as much as possible, and the temperature of the coolant flowing into the condenser 12 can be made higher than the temperature of the coolant having passed through the high-temperature-side radiator 23.

In the second embodiment, the coolant in the high-temperature coolant circuit 20 does not flow through the common radiator 45 in the case of the dehumidifying and heating mode and the heating mode, but the coolant in the high-temperature coolant circuit 20 may flow through the common radiator 45 at a small flow rate in the case of the dehumidifying and heating mode and the heating mode.

For example, in the case of the dehumidifying and heating mode and the heating mode, the coolant in the high-temperature coolant circuit 20 may flow through the common radiator 45 at a small flow rate as compared to the defrosting mode.

In the present embodiment as well, it is possible to reduce the heat shock in each of the common radiator 45 and the condenser 12 when the flow rate of the coolant in the high-temperature coolant circuit 20 flowing through the common radiator 45 increases by switching the dehumidifying and heating mode or the heating mode to the defrosting mode.

That is, when the dehumidifying and heating mode or the heating mode is switched to the defrosting mode, the flow rate of the coolant flowing into the common radiator 45 can be reduced as much as possible, and the temperature of the coolant flowing into the condenser 12 can be made higher than the temperature of the coolant having passed through the common radiator 45.

Although the present disclosure has been described in accordance with the embodiments, it is understood that the present disclosure is not limited to the embodiments and structures. The present disclosure encompasses various modifications and modifications within an equivalent scope. In addition, various combinations and forms, as well as other combinations and forms including only one element, more than that, or less than that, are also within the scope and idea of the present disclosure.

What is claimed is:

1. A refrigeration cycle device comprising:
   a first heat medium circuit through which a first heat medium circulates;
   a second heat medium circuit through which a second heat medium circulates;
   a compressor configured to draw, compress, and discharge a refrigerant;
   a heat radiator disposed in the first heat medium circuit and configured to exchange heat between the refrigerant discharged from the compressor and the first heat medium to cause the refrigerant to dissipate heat and heat the first heat medium;
a decompressor configured to decompress the refrigerant having heat-dissipated in the heat radiator;
a heat absorption unit disposed in the second heat medium circuit and configured to absorb heat by evaporating the refrigerant decompressed in the decompressor;
a heat utilization unit disposed in the first heat medium circuit and configured to utilize heat of the first heat medium heated in the heat radiator;
a heat supply unit disposed in the first heat medium circuit in parallel with the heat utilization unit in a flow of the first heat medium, and configured to supply the heat of the first heat medium heated in the heat radiator to the heat absorption unit;
a branching part configured to branch the first heat medium flowing out of the heat radiator into a flow flowing toward the heat utilization unit and a flow flowing toward the heat supply unit in the first heat medium circuit;
a merging part configured to cause the first heat medium having passed through the heat utilization unit and the first heat medium having passed through the heat supply unit to merge together and to flow toward the heat radiator in the first heat medium circuit;
a three way valve configured to switch an operation state in the first heat medium circuit between a first state in which the first heat medium flowing out of the heat radiator circulates through the heat utilization unit, and a second state in which the first heat medium flowing out of the heat radiator branches at the branching part to a flow toward the heat utilization unit and a flow toward the heat supply unit, the first heat medium circulating between the heat radiator, the heat utilization unit, and the heat supply unit in the second state;
a pump configured to draw and discharge the first heat medium and arranged to adjust a flow amount of the first heat medium flowing in the heat radiator in the first heat medium circuit; and
a controller configured to control the three-way valve and the pump,
wherein the three-way valve is disposed to change a flow ratio between (i) the first heat medium flowing from the branching part to the heat utilization unit and (ii) the first heat medium flowing from the branching part to the heat supply unit,
the controller is configured to switch the three-way valve between the first state and the second state,
the heat absorption unit includes:
    a first heat absorption unit configured to absorb heat directly through evaporation of the refrigerant decompressed in the decompressor; and
    a second heat absorption unit fluidly connected to the first heat absorption unit and configured to absorb heat from an outside air,
the heat supply unit supplies the heat of the heat medium to the second heat absorption unit, and
wherein the controller controls the pump to reduce an output of the pump and to cause a time change rate in the temperature of the first heat medium flowing into the heat radiator to become smaller upon switching the three-way valve from the first state to the second state.

2. The refrigeration cycle device according to claim 1, wherein the three-way valve is configured to adjust a flow rate ratio of the first heat medium flowing between the heat utilization unit and the heat supply unit in the second state, and
the controller controls the three-way valve to cause a flow rate of the first heat medium flowing toward the heat supply unit to become smaller than a flow rate of the first heat medium flowing toward the heat utilization unit in response to the switching operation from the first state to the second state.

3. The refrigeration cycle device according to claim 1, wherein the heat radiator has a heat-exchange structure in which the refrigerant and the first heat medium flow opposite each other.

4. The refrigeration cycle device according to claim 1, further comprising
a heater configured to heat the first heat medium by generating Joule heat,
wherein the heater is disposed on a downstream side of the branching part and on an upstream side of the heat utilization unit in the flow of the first heat medium.

5. The refrigeration cycle device according to claim 1, wherein the pump is disposed on a downstream side of the merging part and on an upstream side of the branching part in the flow of the first heat medium.

6. The refrigeration cycle device according to claim 1, further comprising
a storage part that is provided on a downstream side of the merging part and on an upstream side of the heat radiator, and is configured to store therein the first heat medium.

7. The refrigeration cycle device according to claim 1, wherein
the heat supply unit is configured without having a circulation of the first heat medium in the first state.

8. The refrigeration cycle device according to claim 1, further comprising
an evaporator configured to evaporate the refrigerant decompressed in the decompressor and to cool and dehumidify air, wherein
the heat utilization unit includes a heater core configured to utilize the first heat medium heated in the heat radiator and to heat at least one of air cooled and dehumidified in the evaporator and air flowing while bypassing the evaporator, and
the three-way valve is configured to switch the operation state from the first state to the second state, when a defrosting mode, in which the heat absorption unit is defrosted utilizing the heat of the first heat medium, is switched from a dehumidifying and heating mode in which the air cooled and dehumidified in the evaporator is heated in the heater core, or from a heating mode in which the air flowing while bypassing the evaporator is heated in the heater core.

9. The refrigeration cycle device according to claim 1, wherein the heat supply unit supplies the heat of the heat medium to the heat absorption unit through fins connecting between the heat supply unit and the heat absorption unit.

10. The refrigeration cycle device according to claim 2, wherein the controller is configured to increase the flow rate of the first heat medium flowing toward the heat supply unit in accordance with an elapsed time after the operation state is switched from the first state to the second state.

11. The refrigeration cycle device according to claim 2, wherein the controller is configured to control the three-way valve and to cause a temperature of the first heat medium flowing into the heat radiator to become higher than a dew point temperature at the heat radiator in the second state.

12. The refrigeration cycle device according to claim 2, wherein the controller is configured to control the three-way valve and to cause a temperature of the first heat medium flowing into the heat utilization unit to become higher than a dew point temperature at the heat utilization unit, in the second state.

13. The refrigeration cycle device according to claim 2, wherein the controller is configured to control the three-way valve and to cause a temperature difference between a temperature of the first heat medium at the heat radiator in the second state and a temperature of the heat absorption unit to become within a predetermined range when the operation state is switched to the second state.

14. The refrigeration cycle device according to claim 3, wherein
the heat radiator includes
a condensation portion configured to cool and condense the refrigerant, and
a subcooling portion configured to subcool the refrigerant condensed in the condensation portion, and
the heat radiator has a coolant flow structure in which the coolant flows through the subcooling portion and the condensation portion in this order.

15. A refrigeration cycle device comprising:
a first heat medium circuit through which a first heat medium circulates;
a second heat medium circuit through which a second heat medium circulates;
a compressor configured to draw, compress, and discharge a refrigerant;
a heat radiator disposed in the first heat medium circuit and configured to exchange heat between the refrigerant discharged from the compressor and the first heat medium to cause the refrigerant to dissipate heat and heat the heat medium;
a decompressor configured to decompress the refrigerant having heat-dissipated in the heat radiator;
a heat absorption unit disposed in the second heat medium circuit and configured to absorb heat by evaporating the refrigerant decompressed in the decompressor;
a heat utilization unit disposed in the first heat medium circuit and configured to utilize heat of the first heat medium heated in the heat radiator;
a heat supply unit disposed in the first heat medium circuit in parallel with the heat utilization unit in a flow of the first heat medium, and configured to supply the heat of the first heat medium heated in the heat radiator to the heat absorption unit;
a branching part configured to branch the first heat medium flowing out of the heat radiator into a flow flowing toward the heat utilization unit and a flow flowing toward the heat supply unit in the first heat medium circuit;
a merging part configured to cause the first heat medium having passed through the heat utilization unit and the first heat medium having passed through the heat supply unit to merge together and to flow toward the heat radiator in the first heat medium circuit;
a three-way valve configured to switch an operation state in the first heat medium circuit between a first state in which the first heat medium flowing out of the heat radiator circulates through the heat utilization unit, and a second state in which the first heat medium flowing out of the heat radiator branches at the branching part to a flow toward the heat utilization unit and a flow toward the heat supply unit, the first heat medium circulating between the heat radiator, the heat utilization unit, and the heat supply unit in the second state;
an evaporator configured to evaporate the refrigerant decompressed in the decompressor and to cool and dehumidify air; and
a controller configured to control the operation state of the three-way valve, wherein
the three-way valve is disposed to change a flow ratio between (i) the first heat medium flowing from the branching part to the heat utilization unit and (ii) the first heat medium flowing from the branching part to the heat supply unit,
the heat utilization unit includes a heater core configured to utilize the first heat medium heated in the heat radiator and to heat at least one of air cooled and dehumidified in the evaporator and air flowing while bypassing the evaporator,
the heat absorption unit includes:
a first heat absorption unit configured to absorb heat directly through evaporation of the refrigerant decompressed in the decompressor; and
a second heat absorption unit fluidly connected to the first heat absorption unit and configured to absorb heat from an outside air,
the heat supply unit supplies the heat of the first heat medium to the second heat absorption unit, and
the controller switches the operation state of the three-way valve from the first state to the second state, in response to a switching operation to a defrosting mode, in which the heat absorption unit is defrosted utilizing the heat of the first heat medium, from a dehumidifying and heating mode in which the air cooled and dehumidified in the evaporator is heated in the heater core, or from a heating mode in which the air flowing while bypassing the evaporator is heated in the heater core.

16. The refrigeration cycle device according to claim 15, wherein the three-way valve is configured to adjust a flow rate ratio of the first heat medium flowing between the heat utilization unit and the heat supply unit in the second state, and
the controller is configured to control the three-way valve and to cause a flow rate of the first heat medium flowing toward the heat supply unit to become smaller than a flow rate of the first heat medium flowing toward the heat utilization unit in response to the switching operation from the first state to the second state.

17. A refrigeration cycle device comprising:
a first heat medium circuit through which a first heat medium circulates;
a second heat medium circuit through which a second heat medium circulates;
a compressor configured to draw, compress, and discharge a refrigerant;
a heat radiator disposed in the first heat medium circuit and configured to exchange heat between the refrigerant discharged from the compressor and the first heat medium to cause the refrigerant to dissipate heat and heat the first heat medium;
a decompressor configured to decompress the refrigerant having heat-dissipated in the heat radiator;
a first heat exchanger disposed in the second heat medium circuit and configured to absorb heat by evaporating the refrigerant decompressed in the decompressor;

a second heat exchanger disposed in the first heat medium circuit and configured to utilize heat of the first heat medium heated in the heat radiator;

a third heat exchanger disposed in the first heat medium circuit in parallel with the second heat exchanger in a flow of the first heat medium, and configured to supply the heat of the first heat medium heated in the heat radiator to the first heat exchanger;

a branching valve configured to branch the first heat medium flowing out of the heat radiator into a flow flowing toward the second heat exchanger and a flow flowing toward the third heat exchanger in the first heat medium circuit;

a merging valve configured to cause the first heat medium having passed through the second heat exchanger and the first heat medium having passed through the third heat exchanger to merge together and to flow toward the heat radiator in the first heat medium circuit;

a three-way valve configured to switch an operation state in the first heat medium circuit between a first state in which the first heat medium flowing out of the heat radiator circulates through the second heat exchanger, and a second state in which the first heat medium flowing out of the heat radiator branches at the branching part to a flow toward the second heat exchanger and a flow toward the third heat exchanger, the first heat medium circulating between the heat radiator, the second heat exchanger, and the third heat exchanger in the second state;

a pump configured to draw and discharge the first heat medium, and arranged to adjust a flow amount of the first heat medium flowing in the heat radiator in the first heat medium circuit; and a controller configured to control the three-way valve and the pump, wherein the three-way valve is disposed to change a flow ratio between (i) the first heat medium flowing from the branching valve to the second heat exchanger and (ii) the first heat medium flowing from the branching valve to the third heat exchanger, the controller is configured to switch the three-way valve between the first state and the second state, the first heat exchanger includes:
  a fourth heat exchanger configured to absorb heat directly through evaporation of the refrigerant decompressed in the decompressor; and
  a fifth heat exchanger fluidly connected to the fourth heat exchanger and configured to absorb heat from an outside air, the third heat exchanger supplies the heat of the first heat medium to the fifth heat exchanger, and wherein the controller controls the pump to cause the flow amount of the first heat medium flowing into the heat radiator to become smaller upon switching the three-way valve from the first state to the second state.

18. The refrigeration cycle device according to claim 17, further comprising a reserve tank that is provided on a downstream side of the merging valve and on an upstream side of the heat radiator, and is configured to store therein the heat medium.

* * * * *